US010645726B2

(12) United States Patent
Endo et al.

(10) Patent No.: US 10,645,726 B2
(45) Date of Patent: May 5, 2020

(54) WIRELESS COMMUNICATION TERMINAL, WIRELESS COMMUNICATION METHOD, AND RECORDING MEDIUM

(71) Applicant: OLYMPUS CORPORATION, Hachioji-shi, Tokyo (JP)

(72) Inventors: Takahisa Endo, Tokyo (JP); Yasuhiro Hasegawa, Hanno (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/174,987

(22) Filed: Oct. 30, 2018

(65) Prior Publication Data

US 2019/0069273 A1 Feb. 28, 2019

Related U.S. Application Data

(63) Continuation of application No. PCT/JP2017/018993, filed on May 22, 2017.

(30) Foreign Application Priority Data

May 24, 2016 (WO) .................. PCT/JP2016/065274

(51) Int. Cl.
*H04W 74/08* (2009.01)
*H04W 84/12* (2009.01)
(Continued)

(52) U.S. Cl.
CPC ....... *H04W 74/0808* (2013.01); *H04W 16/14* (2013.01); *H04W 72/02* (2013.01);
(Continued)

(58) Field of Classification Search
CPC ............. H04W 74/0808; H04W 16/14; H04W 74/002; H04W 72/02; H04W 72/082; H04W 84/12; H04W 84/18; H04W 72/04
See application file for complete search history.

(56) References Cited

U.S. PATENT DOCUMENTS

2003/0125067 A1 7/2003 Takeda et al.
2007/0242650 A1 10/2007 Fujiwara
(Continued)

FOREIGN PATENT DOCUMENTS

JP 2003-258719 A 9/2003
JP 2006-25388 A 1/2006
(Continued)

OTHER PUBLICATIONS

International Search Report dated Jun. 13, 2017, issued in application No. PCT/JP2017/018993, w/English translation (2 pages).
(Continued)

*Primary Examiner* — Afshawn M Towfighi
(74) *Attorney, Agent, or Firm* — Westerman, Hattori, Daniels & Adrian, LLP

(57) ABSTRACT

In a wireless communication terminal, a controller wirelessly receives communication channel information from a first terminal by using a communicator. The communication channel information transmitted from the first terminal to the wireless communication terminal includes first information and second information. The communication channel information transmitted from the second terminal to the first terminal includes the second information. The first information represents a communication channel used for wireless communication by the first terminal. The second information represents a communication channel used for wireless communication by the second terminal. The controller determines a communication channel used for wireless commu-
(Continued)

nication by the wireless communication terminal on the basis of the communication channel information.

7 Claims, 20 Drawing Sheets

(51) Int. Cl.
    *H04W 84/18*     (2009.01)
    *H04W 72/04*     (2009.01)
    *H04W 72/02*     (2009.01)
    *H04W 72/08*     (2009.01)
    *H04W 16/14*     (2009.01)
    *H04W 74/00*     (2009.01)

(52) U.S. Cl.
    CPC ......... *H04W 72/04* (2013.01); *H04W 72/082* (2013.01); *H04W 74/002* (2013.01); *H04W 84/12* (2013.01); *H04W 84/18* (2013.01)

(56) References Cited

U.S. PATENT DOCUMENTS

| | | | |
|---|---|---|---|
| 2009/0122775 A1* | 5/2009 | Haartsen | H04L 5/0005 370/338 |
| 2009/0279463 A1* | 11/2009 | Kuliner | H04W 84/18 370/311 |
| 2013/0176897 A1 | 7/2013 | Wang et al. | |
| 2013/0294436 A1 | 11/2013 | Kim et al. | |
| 2014/0287790 A1 | 9/2014 | Ichikawa et al. | |
| 2014/0313966 A1 | 10/2014 | Shukla et al. | |
| 2016/0014780 A1 | 1/2016 | Horisaki et al. | |
| 2016/0127996 A1 | 5/2016 | Patil et al. | |
| 2016/0323925 A1 | 11/2016 | Alanen et al. | |
| 2018/0027420 A1 | 1/2018 | Takahashi et al. | |

FOREIGN PATENT DOCUMENTS

| | | |
|---|---|---|
| JP | 4311262 B2 | 8/2009 |
| JP | 2009-206999 A | 9/2009 |
| JP | 2011-15048 A | 1/2011 |
| JP | 4886814 B2 | 2/2012 |
| JP | 5210404 B2 | 6/2013 |
| JP | 2015-95838 A | 5/2015 |
| WO | 2015/034934 A2 | 3/2015 |

OTHER PUBLICATIONS

International Search Report dated Jun. 13, 2017, issued in application No. PCT/JP2017/018994, w/English translation (2 pages).
International Search Report dated Jun. 28, 2016, issued in application No. PCT/JP2016/065274, w/English translation (2 pages).
Notice of Allowance dated Mar. 21, 2019, issued in U.S. Appl. No. 16/190,476 (16 pages).
Notice of Allowance dated Jan. 6, 2020, issued in U.S. Appl. No. 16/174,943 (8 pages).

* cited by examiner

FIG. 12

|  | TERMINAL NAME | COMMUNICATION CHANNEL | ROUTE INFORMATION | |
| --- | --- | --- | --- | --- |
|  |  |  | TRANSMISSION SOURCE | TRANSMISSION DESTINATION |
| FIRST COMMUNICATION CHANNEL INFORMATION | RECEIVER 206 | CH2 | – | – |
| SECOND COMMUNICATION CHANNEL INFORMATION | RECEIVER 204 | CH5 | RECEIVER 204 | RECEIVER 206 |
| THIRD COMMUNICATION CHANNEL INFORMATION | – | – | – | – |

FIG. 13

|  | TERMINAL NAME | COMMUNICATION CHANNEL | ROUTE INFORMATION | |
| --- | --- | --- | --- | --- |
|  |  |  | TRANSMISSION SOURCE | TRANSMISSION DESTINATION |
| FIRST COMMUNICATION CHANNEL INFORMATION | RECEIVER 204 | CH5 | – | – |
| SECOND COMMUNICATION CHANNEL INFORMATION | RECEIVER 206 | CH2 | RECEIVER 206 | RECEIVER 204 |
|  | RECEIVER 203 | CH3 | RECEIVER 203 | RECEIVER 204 |
| THIRD COMMUNICATION CHANNEL INFORMATION | RECEIVER 204 | CH5 | RECEIVER 204 | RECEIVER 206 |

FIG. 14

| | TERMINAL NAME | COMMUNICATION CHANNEL | ROUTE INFORMATION | |
|---|---|---|---|---|
| | | | TRANSMISSION SOURCE | TRANSMISSION DESTINATION |
| FIRST COMMUNICATION CHANNEL INFORMATION | RECEIVER 203 | CH3 | – | – |
| SECOND COMMUNICATION CHANNEL INFORMATION | RECEIVER 204 | CH5 | RECEIVER 204 | RECEIVER 203 |
| | RECEIVER 202 | CH2 | RECEIVER 202 | RECEIVER 203 |
| THIRD COMMUNICATION CHANNEL INFORMATION | RECEIVER 206 | CH2 | RECEIVER 206 | RECEIVER 204 |
| | RECEIVER 203 | CH3 | RECEIVER 203 | RECEIVER 204 |
| | RECEIVER 204 | CH5 | RECEIVER 204 | RECEIVER 206 |

FIG. 15

| | TERMINAL NAME | COMMUNICATION CHANNEL | ROUTE INFORMATION | |
|---|---|---|---|---|
| | | | TRANSMISSION SOURCE | TRANSMISSION DESTINATION |
| FIRST COMMUNICATION CHANNEL INFORMATION | RECEIVER 202 | CH2 | – | – |
| SECOND COMMUNICATION CHANNEL INFORMATION | RECEIVER 203 | CH3 | RECEIVER 203 | RECEIVER 202 |
| | RECEIVER 201 | CH1 | RECEIVER 201 | RECEIVER 202 |
| THIRD COMMUNICATION CHANNEL INFORMATION | RECEIVER 204 | CH5 | RECEIVER 204 | RECEIVER 203 |
| | RECEIVER 202 | CH2 | RECEIVER 202 | RECEIVER 203 |
| | RECEIVER 206 | CH2 | RECEIVER 206 | RECEIVER 204 |
| | RECEIVER 203 | CH3 | RECEIVER 203 | RECEIVER 204 |
| | RECEIVER 204 | CH5 | RECEIVER 204 | RECEIVER 206 |

FIG. 16

| | TERMINAL NAME | COMMUNICATION CHANNEL | ROUTE INFORMATION | |
|---|---|---|---|---|
| | | | TRANSMISSION SOURCE | TRANSMISSION DESTINATION |
| FIRST COMMUNICATION CHANNEL INFORMATION | RECEIVER 205 | CH4 | - | - |
| SECOND COMMUNICATION CHANNEL INFORMATION | - | - | - | - |
| THIRD COMMUNICATION CHANNEL INFORMATION | - | - | - | - |

FIG. 17

| TERMINAL NAME | TYPE | COMMUNICATION CHANNEL | ROUTE INFORMATION | | |
|---|---|---|---|---|---|
| | | | TRANSMISSION SOURCE | TRANSMISSION DESTINATION | |
| RECEIVER 201 | 1 | CH1 | - | - | |
| RECEIVER 202 | 2 | CH2 | RECEIVER 202 | RECEIVER 201 | RT100 |
| RECEIVER 205 | 2 | CH4 | RECEIVER 205 | RECEIVER 201 | RT101 |
| RECEIVER 203 | 3 | CH3 | RECEIVER 203 | RECEIVER 202 | RT102 |
| RECEIVER 201 | 3 | CH1 | RECEIVER 201 | RECEIVER 202 | |
| RECEIVER 204 | 3 | CH5 | RECEIVER 204 | RECEIVER 203 | RT103 |
| RECEIVER 202 | 3 | CH2 | RECEIVER 202 | RECEIVER 203 | |
| RECEIVER 206 | 3 | CH2 | RECEIVER 206 | RECEIVER 204 | RT104 |
| RECEIVER 203 | 3 | CH3 | RECEIVER 203 | RECEIVER 204 | |
| RECEIVER 204 | 3 | CH5 | RECEIVER 204 | RECEIVER 206 | |

FIG. 18

| TERMINAL NAME | NUMBER OF HOPS |
|---|---|
| RECEIVER 201 | 0 |
| RECEIVER 202 | 1 |
| RECEIVER 203 | 2 |
| RECEIVER 204 | 3 |
| RECEIVER 205 | 1 |
| RECEIVER 206 | 4 |

FIG. 19

| COMMUNICATION CHANNEL | NUMBER OF HOPS: 1 | | | NUMBER OF HOPS: 2 | | | NUMBER OF HOPS: 3 | | | NUMBER OF HOPS: 4 | | | DEGREE OF INTERFERENCE |
|---|---|---|---|---|---|---|---|---|---|---|---|---|---|
| | NUMBER OF TERMINALS | WEIGHTING FACTOR | TERMINAL NAME | NUMBER OF TERMINALS | WEIGHTING FACTOR | TERMINAL NAME | NUMBER OF TERMINALS | WEIGHTING FACTOR | TERMINAL NAME | NUMBER OF TERMINALS | WEIGHTING FACTOR | TERMINAL NAME | |
| CH1 | 0 | 100 | | 0 | 50 | | 0 | 20 | | 0 | 10 | | 0 |
| CH2 | 1 | 100 | RECEIVER 202 | 0 | 50 | | 0 | 20 | | 1 | 10 | RECEIVER 206 | 110 |
| CH3 | 0 | 100 | | 1 | 50 | RECEIVER 203 | 0 | 20 | | 0 | 10 | | 50 |
| CH4 | 1 | 100 | RECEIVER 205 | 0 | 50 | | 0 | 20 | | 0 | 10 | | 100 |
| CH5 | 0 | 100 | | 0 | 50 | | 1 | 20 | RECEIVER 204 | 0 | 10 | | 20 |

FIG. 20

| NUMBER OF HOPS | WEIGHTING FACTOR |
|---|---|
| 1 | 100 |
| 2 | 50 |
| 3 | 20 |
| 4 | 10 |

FIG. 21

| PRIORITY LEVEL | COMMUNICATION CHANNEL |
|---|---|
| 1 | CH5 |
| 2 | CH3 |
| 3 | CH4 |
| 4 | CH2 |

FIG. 23

|  | TERMINAL NAME | COMMUNICATION CHANNEL | ROUTE INFORMATION | |
|---|---|---|---|---|
|  |  |  | TRANSMISSION SOURCE | TRANSMISSION DESTINATION |
| FIRST COMMUNICATION CHANNEL INFORMATION | RECEIVER 202 | CH2 | — | — |
| SECOND COMMUNICATION CHANNEL INFORMATION | RECEIVER 203 | CH3 | RECEIVER 203 | RECEIVER 202 |
|  | RECEIVER 201 | CH1 | RECEIVER 201 | RECEIVER 202 |

FIG. 24

|  | TERMINAL NAME | COMMUNICATION CHANNEL | ROUTE INFORMATION | |
|---|---|---|---|---|
|  |  |  | TRANSMISSION SOURCE | TRANSMISSION DESTINATION |
| FIRST COMMUNICATION CHANNEL INFORMATION | RECEIVER 205 | CH4 | — | — |
| SECOND COMMUNICATION CHANNEL INFORMATION | — | — | — | — |

FIG. 25

| TERMINAL NAME | TYPE | COMMUNICATION CHANNEL | ROUTE INFORMATION | | |
|---|---|---|---|---|---|
|  |  |  | TRANSMISSION SOURCE | TRANSMISSION DESTINATION | |
| RECEIVER 201 | 1 | CH1 | — | — | |
| RECEIVER 202 | 2 | CH2 | RECEIVER 202 | RECEIVER 201 | ～RT110 |
| RECEIVER 205 | 2 | CH4 | RECEIVER 205 | RECEIVER 201 | ～RT111 |
| RECEIVER 203 | 3 | CH3 | RECEIVER 203 | RECEIVER 202 | ～RT112 |
| RECEIVER 201 | 3 | CH1 | RECEIVER 201 | RECEIVER 202 | |

FIG. 26

| TERMINAL NAME | NUMBER OF HOPS |
|---|---|
| RECEIVER 201 | 0 |
| RECEIVER 202 | 1 |
| RECEIVER 203 | 2 |
| RECEIVER 205 | 1 |

FIG. 27

| COMMUNICATION CHANNEL | NUMBER OF HOPS:1 | | | NUMBER OF HOPS:2 | | | DEGREE OF INTERFERENCE |
|---|---|---|---|---|---|---|---|
| | NUMBER OF TERMINALS | WEIGHTING FACTOR | TERMINAL NAME | NUMBER OF TERMINALS | WEIGHTING FACTOR | TERMINAL NAME | |
| CH1 | 0 | 100 | | 0 | 50 | | 0 |
| CH2 | 1 | 100 | RECEIVER 202 | 0 | 50 | | 100 |
| CH3 | 0 | 100 | | 1 | 50 | RECEIVER 203 | 50 |
| CH4 | 1 | 100 | RECEIVER 205 | 0 | 50 | | 100 |
| CH5 | 0 | 100 | | 0 | 50 | | 0 |

FIG. 28

| PRIORITY LEVEL | COMMUNICATION CHANNEL |
|---|---|
| 1 | CH5 |
| 2 | CH3 |
| 3 | CH2 |
| 4 | CH4 |

WIRELESS COMMUNICATION TERMINAL, WIRELESS COMMUNICATION METHOD, AND RECORDING MEDIUM

The present application is a continuation application based on International Patent Application No. PCT/JP2016/065274, filed on May 24, 2016, and International Patent Application No. PCT/JP2017/018993, filed on May 22, 2017, the contents of which are incorporated herein by reference.

BACKGROUND OF THE INVENTION

Field of the Invention

The present invention relates to a wireless communication terminal, a wireless communication method, and a recording medium.

Description of Related Art

There is a demand to minimize interruption of image display in an image communication system as much as possible, and to simultaneously operate a plurality of image communication systems. In order to realize these demands in a system in which image communication is wirelessly performed, it is necessary to reduce electric wave interference among a plurality of systems. Accordingly, in each system, it is necessary to select a communication channel that does not overlap any communication channel used by another system.

In Japanese Patent No. 5210404, a technology relating to selection of a communication channel used by an access point of a wireless local area network (LAN) is disclosed. The device disclosed in Japanese Patent No. 5210404 detects intensities of reception signals in communication channels used by other access points and selects a communication channel on the basis of the intensities of the reception signals.

SUMMARY OF THE INVENTION

According to a first aspect of the present invention, a wireless communication terminal includes a communicator and a controller. The controller wirelessly receives communication channel information from a first terminal by using the communicator. The communication channel information represents a communication channel used for wireless communication by at least one of a plurality of terminals including the first terminal and a second terminal. The first terminal is able to directly wirelessly communicate with a fourth terminal and directly communicate with the wireless communication terminal. The second terminal is a terminal other than the wireless communication terminal and is able to directly wirelessly communicate with a fifth terminal and directly communicate with the first terminal. The communication channel information transmitted from the first terminal to the wireless communication terminal includes first information and second information. The communication channel information transmitted from the second terminal to the first terminal includes the second information. The first information represents a communication channel used for wireless communication with the fourth terminal by the first terminal. The second information represents a communication channel used for wireless communication with the fifth terminal by the second terminal. The controller determines a communication channel used for wireless communication by the wireless communication terminal on the basis of the first information and the second information of the second terminal that is unable to directly wirelessly communicate with the wireless communication terminal.

According to a second aspect of the present invention, in the first aspect, the controller may estimate a degree of interference for each of a plurality of communication channels having a possibility of being used by the wireless communication terminal by using a weighting factor for a third terminal which is using each of the plurality of communication channels. The third terminal may be one of the plurality of terminals. The weighting factor may be in inversely proportion to a hop number. The hop number may be the number of sections through which the communication channel information transmitted by the third terminal passes before the communication channel information is received by the wireless communication terminal. Each of the sections may be composed of a communication route of a transmission terminal that has transmitted the communication channel information and a reception terminal that has received the communication channel information from the transmission terminal. Each of the transmission terminal and the reception terminal may be one of the plurality of terminals. The controller may determine to use the communication channel of which the estimated degree of interference is relatively low.

According to a third aspect of the present invention, in the second aspect, the controller may calculate a first value for each communication channel included in the plurality of communication channels and for each hop number by multiplying the number of the third terminals of which the hop numbers are the same by the weighting factor. The controller may estimate the degree of interference by calculating a second value acquired by adding the first values calculated for each hop number for each of the communication channel.

According to a fourth aspect of the present invention, in the second aspect, the controller may estimate the degree of interference by using only the communication channel information representing a communication channel used for wireless communication by the third terminal of which the hop number is equal to or less than "2" among the received communication channel information.

According to a fifth aspect of the present invention, in the second aspect, the controller may determine whether or not there is a communication channel that is not used in any one of the plurality of terminals on the basis of the communication channel information. In a case in which the controller determines that there is no communication channel that is not used in any one of the plurality of terminals, the controller may determine to use the communication channel of which the estimated degree of interference is relatively low among communication channels used by the first terminal.

According to a sixth aspect of the present invention, a wireless communication method includes a first step and a second step executed by a wireless communication terminal. In the first step, communication channel information is wirelessly received from a first terminal. The communication channel information represents a communication channel used for wireless communication by at least one of a plurality of terminals including the first terminal and a second terminal. The first terminal is able to directly wirelessly communicate with a fourth terminal and directly communicate with the wireless communication terminal. The second terminal is a terminal other than the wireless communication terminal and is able to directly wirelessly communicate with a fifth terminal and directly communicate with the first terminal. The communication channel information transmitted from the first terminal to the wireless communication terminal includes first information and second information. The communication channel information transmitted from the second terminal to the first terminal includes the second information. The first information represents a communication channel used for wireless communication with the fourth terminal by the first terminal. The second information represents a communication channel used for wireless communication with the fifth terminal by the second terminal. In the second step, a communication channel used for wireless communication by the wireless communication terminal is determined on the basis of the first information and the second information of the second terminal that is unable to directly wirelessly communicate with the wireless communication terminal.

According to a seventh aspect of the present invention, a non-transitory computer-readable recording medium saves a program for causing a computer of a wireless communication terminal to execute a first step and a second step. In the first step, communication channel information is wirelessly received from a first terminal. The communication channel information represents a communication channel used for wireless communication by at least one of a plurality of terminals including the first terminal and a second terminal. The first terminal is able to directly wirelessly communicate with a fourth terminal and directly communicate with the wireless communication terminal. The second terminal is a terminal other than the wireless communication terminal and is able to directly wirelessly communicate with a fifth terminal and directly communicate with the first terminal. The communication channel information transmitted from the first terminal to the wireless communication terminal includes first information and second information. The communication channel information transmitted from the second terminal to the first terminal includes the second information. The first information represents a communication channel used for wireless communication with the fourth terminal by the first terminal. The second information represents a communication channel used for wireless communication with the fifth terminal by the second terminal. In the second step, a communication channel used for wireless communication by the wireless communication terminal is determined on the basis of the first information and the second information of the second terminal that is unable to directly wirelessly communicate with the wireless communication terminal.

BRIEF DESCRIPTION OF THE DRAWINGS

FIG. 12 is a diagram showing communication channel information according to the first embodiment of the present invention.

FIG. 13 is a diagram showing communication channel information according to the first embodiment of the present invention.

FIG. 14 is a diagram showing communication channel information according to the first embodiment of the present invention.

FIG. 15 is a diagram showing communication channel information according to the first embodiment of the present invention.

FIG. 16 is a diagram showing communication channel information according to the first embodiment of the present invention.

FIG. 17 is a diagram showing a communication channel information table according to the first embodiment of the present invention.

FIG. 18 is a diagram showing a hop number table according to the first embodiment of the present invention.

FIG. 19 is a diagram showing a communication channel evaluation table according to the first embodiment of the present invention.

FIG. 20 is a diagram showing a weighting factor table according to the first embodiment of the present invention.

FIG. 21 is a diagram showing a communication channel priority table according to the first embodiment of the present invention.

FIG. 23 is a diagram showing communication channel information according to a second embodiment of the present invention.

FIG. 24 is a diagram showing communication channel information according to the second embodiment of the present invention.

FIG. 25 is a diagram showing a communication channel information table according to the second embodiment of the present invention.

FIG. 26 is a diagram showing a hop number table according to the second embodiment of the present invention.

FIG. 27 is a diagram showing a communication channel evaluation table according to the second embodiment of the present invention.

FIG. 28 is a diagram showing a communication channel priority table according to the second embodiment of the present invention.

DETAILED DESCRIPTION OF THE INVENTION

Embodiments of the present invention will be described with reference to the drawings.

First Embodiment

Figure 1:
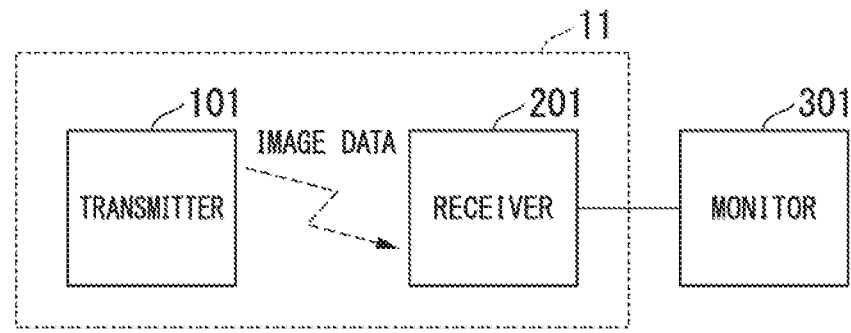
FIG. 1 is a block diagram showing the configuration of an image communication system according to a first embodiment of the present invention.

FIG. 1 shows the configuration of an image communication system 11 according to a first embodiment of the present invention. As shown in FIG. 1, the image communication system 11 includes a transmitter 101 and a receiver 201. The transmitter 101 and the receiver 201 perform wireless communication. The receiver 201 is connected to a monitor 301 (display) by using a cable or the like. For example, the monitor 301 is composed of a liquid crystal display device and a control circuit thereof.

For example, the image communication system 11 is a wireless endoscope system. For example, the transmitter 101 is a wireless endoscope. The image communication system 11 is not limited to the wireless endoscope system but may be an arbitrary system that can perform wireless communication. While image communication will be described below as an example, each aspect of the present invention may be applied to a system that performs communication other than image communication.

Figure 2:
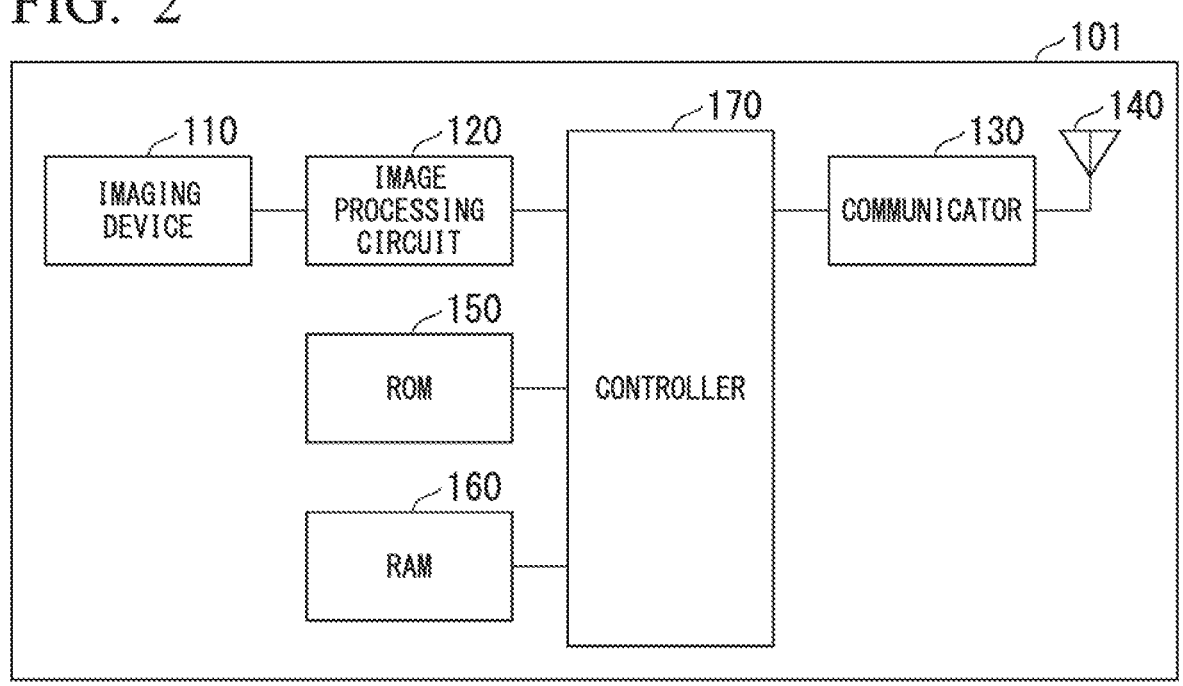
FIG. 2 is a block diagram showing the configuration of a transmitter according to the first embodiment of the present invention.

FIG. 2 shows the configuration of the transmitter 101. As shown in FIG. 2, the transmitter 101 includes an imaging device 110, an image processing circuit 120, a communicator 130, an antenna 140, a ROM 150, a RAM 160, and a controller 170.

The imaging device 110 is an image sensor. For example, the imaging device 110 is composed of a CCD or a CMOS sensor. The imaging device 110 converts light formed as an image by a lens into an electric signal, in other words, an imaging signal. An analog imaging signal output from the imaging device 110 is converted into a digital signal, in other words, image data, by an analog-to-digital converter (AD converter). In other words, the imaging device 110 images a subject and generates image data. The imaging device 110 images a subject for every imaging period and generates image data of each frame.

The image processing circuit 120 performs image processing of image data output from the imaging device 110. For example, the image processing circuit 120 converts image data into data that is appropriate for a predetermined moving image format, thereby generating moving image data. The image processing circuit 120 may perform an image compressing process for image data.

The communicator 130 includes a high frequency circuit unit that is required for wireless communication, a circuit unit that is used for encoding and decoding, and a buffer memory. For example, a wireless LAN protocol (IEEE802.11) is used as a wireless communication method. The antenna 140 is connected to the communicator 130. The communicator 130 wirelessly communicates with the receiver 201 through the antenna 140. The communicator 130 transmits image data and information to the receiver 201 through wireless communication. The communicator 130 receives information from the receiver 201 through wireless communication.

The ROM 150 is a nonvolatile memory such as a flash ROM or the like. Program data and various kinds of setting information are stored in the ROM 150. The program data is used for controlling the transmitter 101. The setting information includes communication setting parameters. The RAM 160 is a volatile memory. The RAM 160 is used as a buffer, a work area, and a temporary area. The buffer is used for temporarily storing image data. The work area is used for an arithmetic operation and the like used by the controller 170. The temporary area is used for temporarily storing various kinds of setting information and the like.

The controller 170 is composed of at least one of a processor and a logic circuit. For example, the processor is at least one of a central processing unit (CPU), a digital signal processor (DSP), and a graphics processing unit (GPU). For example, the logic circuit is at least one of an application specific integrated circuit (ASIC) and a field programmable gate array (FPGA). The controller 170 can include one or a plurality of processors. The controller 170 can include one or a plurality of logic circuits. The controller 170 operates in accordance with a program stored in the ROM 150. In this way, the controller 170 controls the operation of the transmitter 101.

For example, the functions of the controller 170 can be realized as software functions when the controller 170 reads and executes a program including commands defining the operations of the controller 170. This program, for example, may be provided by using a "computer-readable storage medium" such as a flash memory. In addition, the program described above may be transmitted from a computer including a storage device and the like in which this program is stored to the transmitter 101 through a transmission medium or by using carrier waves in a transmission medium. The "transmission medium" transmitting a program is a medium that has a function of transmitting information such as a network (communication network) including the Internet and the like or a communication circuit line (communication line) including a telephone circuit line and the like. In addition, the program described above may realize at least some of the functions described above. Furthermore, the program described above may be a differential file (differential program) that can realize the functions described above in combination with a program that has already been recorded in a computer.

The controller 170 transmits image data and information to the receiver 201 by using the communicator 130. More specifically, the controller 170 controls the communicator 130 such that image data and information are transmitted to the receiver 201. In other words, the controller 170 causes the communicator 130 to transmit image data and information for the receiver 201. In this way, the communicator 130 transmits the image data and the information to the receiver 201. The controller 170 receives information from the receiver 201 by using the communicator 130. More specifically, the controller 170 controls the communicator 130 such that information is received from the receiver 201. In other words, the controller 170 causes the communicator 130 to receive information transmitted from the receiver 201. In this way, the communicator 130 receives information from the receiver 201.

The configurations of the transmitters other than the transmitter 101 are similar to that of the transmitter 101 shown in FIG. 2.

Figure 3:
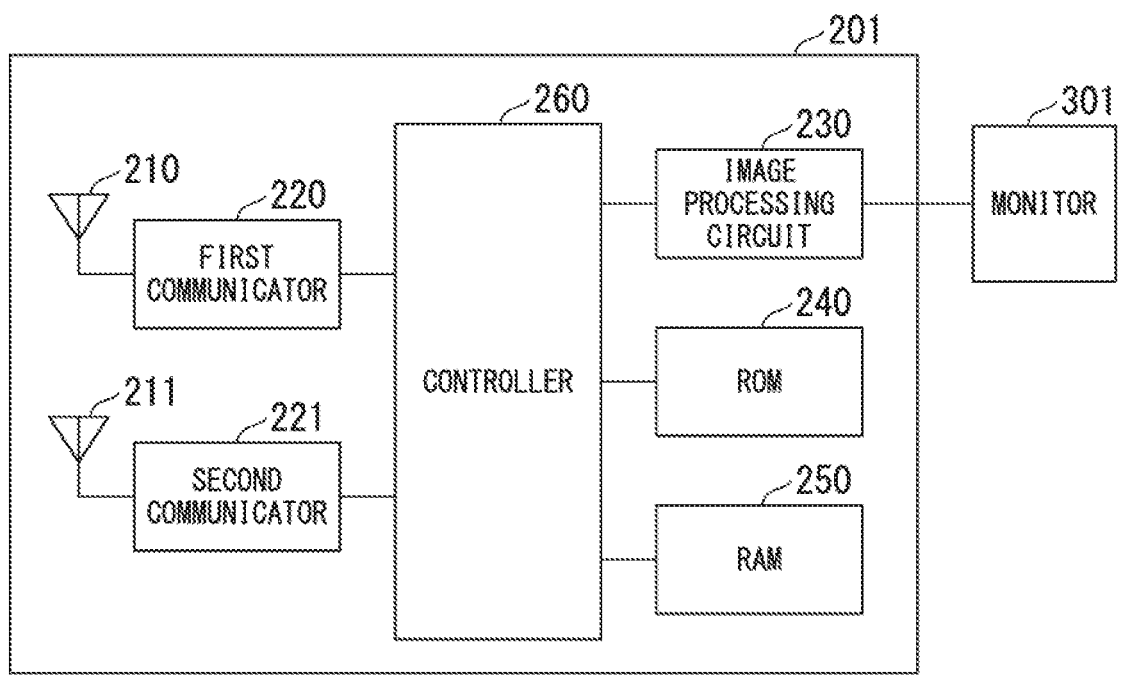
FIG. 3 is a block diagram showing the configuration of a receiver according to the first embodiment of the present invention.

FIG. 3 shows the configuration of the receiver 201 (wireless communication terminal). As shown in FIG. 3, the receiver 201 includes a first antenna 210, a second antenna 211, a first communicator 220, a second communicator 221, an image processing circuit 230, a ROM 240, a RAM 250, and a controller 260 (control unit).

A schematic configuration of the receiver 201 will be described. The controller 260 wirelessly receives communication channel information from a first terminal by using the second communicator 221. The communication channel information represents communication channels used for wireless communication by at least one of a plurality of terminals including the first terminal and a second terminal. The first terminal can directly communicate with the receiver 201. The second terminal can directly communicate with the first terminal and is a terminal other than the receiver 201. The communication channel information transmitted from the first terminal to the receiver 201 includes first information and second information. Communication channel information transmitted from the second terminal to the first terminal includes the second information. The first information represents a communication channel used for wireless communication by the first terminal. The second information represents a communication channel used for wireless communication by the second terminal. The controller 260 determines a communication channel used for wireless communication by the receiver 201 (the first communicator 220) on the basis of the communication channel information.

The controller 260 sets the determined communication channel in the first communicator 220. A communication channel that is the same as or different from the communication channel set in the second communicator 221 is set in the first communicator 220. In other words, a communication channel that is the same as or different from the communication channel used for communication of the communication channel information is used for wireless communication of information other than the communication channel information. The first information may represent a communication channel used for wireless communication of information other than the communication channel information by the first terminal. The second information may represent a communication channel used for wireless communication of information other than the communication channel information by the second terminal.

The controller 260 additionally wirelessly transmits the communication channel information to the first terminal by using the second communicator 221. The communication channel information transmitted from the receiver 201 to the first terminal represents a communication channel used for wireless communication by the receiver 201. The communication channel information transmitted from the receiver 201 to the first terminal may represent a communication channel used for wireless communication of information other than the communication channel information by the receiver 201.

In a case in which communication channel information is received from at least one of a plurality of first terminals, the controller 260 transmits the received communication channel information to a first terminal other than a first terminal that has transmitted the communication channel information by using the second communicator 221.

A detailed configuration of the receiver 201 will be described.

The first antenna 210 is connected to the first communicator 220, and the second antenna 211 is connected to the second communicator 221. Each of the first communicator 220 and the second communicator 221 includes a high frequency circuit unit that is required for wireless communication, a circuit unit that is used for encoding and decoding, and a buffer memory. For example, a wireless LAN protocol (IEEE802.11) is used as a wireless communication method. The first communicator 220 wirelessly communicates with the transmitter 101 through the first antenna 210. The first communicator 220 receives image data and information from the transmitter 101 through wireless communication. The first communicator 220 transmits necessary information to the transmitter 101 through wireless communication. The second communicator 221 performs wireless communication with other receivers through the second antenna 211. The second communicator 221 receives communication channel information from other receivers through wireless communication. The second communicator 221 transmits the communication channel information to other receivers through wireless communication.

The image processing circuit 230 performs image processing for the image data received by the first communicator 220. For example, the image processing circuit 230 converts image data into display data having a format used for displaying an image. For example, the image processing circuit 230 converts image data into an NTSC signal or an HDMI (registered trademark) signal. In a case in which the image data is compressed, the image processing circuit 230 may decompress the image data. The image processing circuit 230 outputs the display data to the monitor 301. The monitor 301 displays an image on the basis of the display data.

The ROM 240 is a non-volatile memory such as a flash ROM. Program data and various kinds of setting information are stored in the ROM 240. The program data is used for controlling the receiver 201. The setting information includes communication setting parameters. The RAM 250 is a volatile memory. The RAM 250 is used as a buffer, a work area, and a temporary area. The buffer is used for temporarily storing received image data. The work area is used for an arithmetic operation used by the controller 260 and the like. The temporary area is used for temporarily storing various kinds of setting information and the like.

The controller 260 is composed of at least one of a processor and a logic circuit. The controller 260 may include one or a plurality of processors. The controller 260 may include one or a plurality of logic circuits. The controller 260 operates in accordance with a program stored in the ROM 240. In this way, the controller 260 controls the operation of the receiver 201.

The controller 260 receives image data and information from the transmitter 101 by using the first communicator 220. More specifically, the controller 260 controls the first communicator 220 such that image data and information are received from the transmitter 101. In other words, the controller 260 causes the first communicator 220 to receive image data and information transmitted from the transmitter 101. In this way, the first communicator 220 receives image data and information from the transmitter 101. The controller 260 transmits information to the transmitter 101 by using the first communicator 220. More specifically, the controller 260 controls the first communicator 220 such that information is transmitted to the transmitter 101. In other words, the controller 260 causes the first communicator 220 to transmit information for the transmitter 101. In this way, the first communicator 220 transmits information to the transmitter 101.

The controller 260 receives communication channel information from other receivers by using the second communicator 221. More specifically, the controller 260 controls the second communicator 221 such that communication channel information is received from other receivers. In other words, the controller 260 causes the second communicator 221 to receive the communication channel information transmitted from other receivers. In this way, the second communicator 221 receives the communication channel information from other receivers. The controller 260 transmits the communication channel information to the other receivers by using the second communicator 221. More specifically, the controller 260 controls the second communicator 221 such that the communication channel information is transmitted to the other receivers. In other words, the controller 260 causes the second communicator 221 to transmit the communication channel information for the other receivers. In this way, the second communicator 221 transmits the communication channel information to the other receivers.

For example, the functions of the controller 260 can be realized as software functions when the controller 260 reads and executes a program including commands defining the operation of the controller 260. This program can be realized similarly to the program realizing the functions of the controller 170.

The receiver 201 may include three or more communicators. As will be described in a modified example of the first embodiment, the receiver 201 may include only one communicator.

The configurations of the other receivers other than the receiver 201 are similar to the configuration of the receiver 201 shown in FIG. 3.

Figure 4:
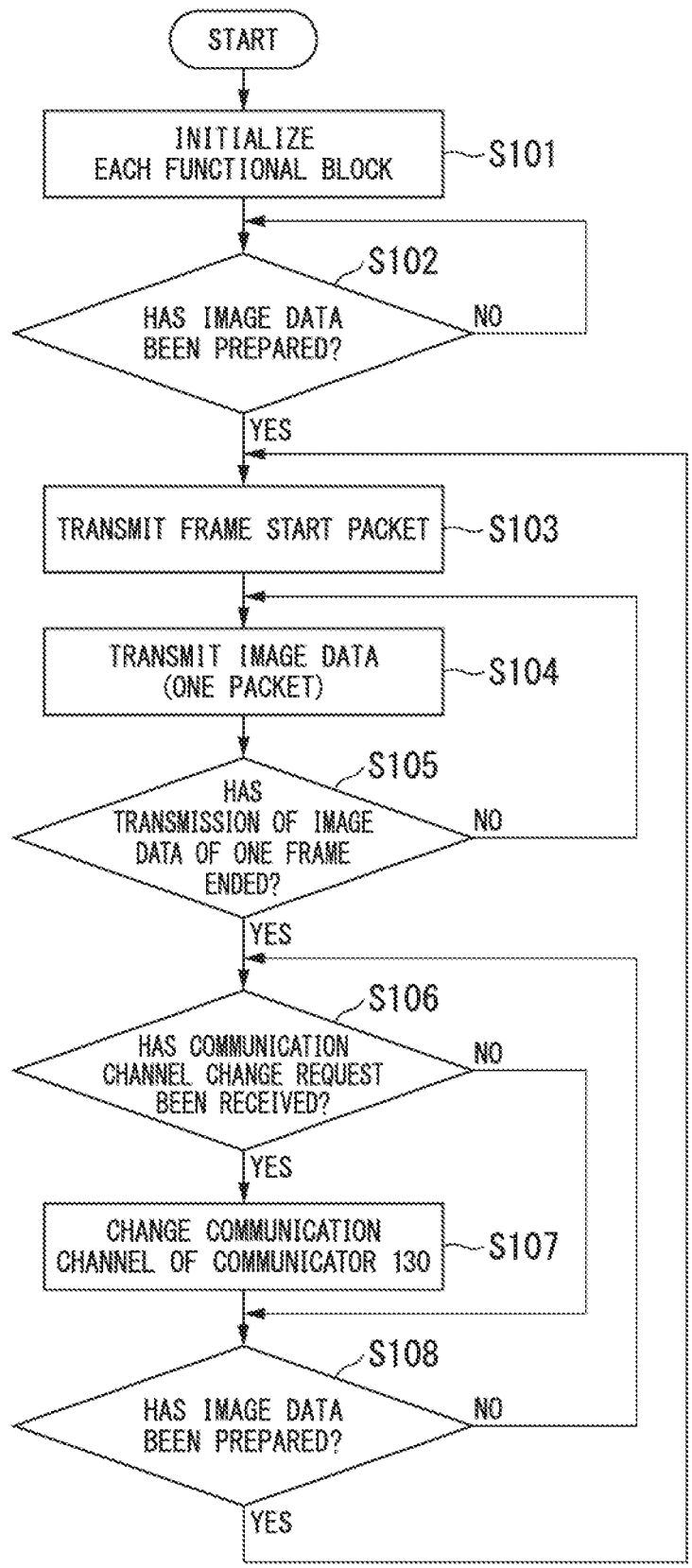
FIG. 4 is a flowchart showing the procedure of an operation of a transmitter according to the first embodiment of the present invention.

Details of operations according to the first embodiment will be described. The operation of the transmitter 101 will be described. FIG. 4 shows the procedure of the operation of the transmitter 101.

When power is supplied to the transmitter 101, the controller 170 initializes each functional block (Step S101). In Step S101, the controller 170 initializes setting of communication channels in the communicator 130. In this way, a predetermined communication channel is set in the communicator 130.

In Step S101, the imaging device 110 starts imaging. In Step S101, the image processing circuit 120 starts image processing.

After Step S101, the controller 170 determines whether or not image data has been prepared by determining whether or not the image processing circuit 120 notified of a ready interrupt (Step S102).

In Step S102, in a case in which the controller 170 determines that the image data has not been prepared, the determination of Step S102 is repeated. In Step S102, in a case in which the controller 170 determines that the image data has been prepared, the controller 170 transmits a frame start packet to the receiver 201 by using the communicator 130 (Step S103).

After Step S103, the controller 170 transmits image data corresponding to one packet to the receiver 201 by using the communicator 130 (Step S104). The image data of one frame is divided into a plurality of pieces of data, and a packet including one of the plurality of individual pieces of data is transmitted in Step S104. In other words, the communicator 130 sequentially transmits packets each including one of the plurality of pieces of data composing the image data of one frame to the receiver 201.

After Step S104, the controller 170 determines whether or not the transmission of the image data of one frame has ended (Step S105).

In a case in which the controller 170 determines that the transmission of the image data of one frame has not ended, the process of Step S104 is executed. In a case in which the controller 170 determines that the transmission of the image data of one frame has ended, the controller 170 monitors the communicator 130. In a case in which it is determined that the communication channel needs to be changed in the receiver 201, a communication channel change request is transmitted from the receiver 201. The communication channel change request includes information of a communication channel determined by the receiver 201. When the communication channel change request is transmitted from the receiver 201, the controller 170 receives the communication channel change request from the receiver 201 by using the communicator 130. The controller 170 determines whether or not a communication channel change request has been received (Step S106).

In Step S106, in a case in which the controller 170 determines that the communication channel change request has not been received, the process of Step S108 is executed. In Step S106, in a case in which the controller 170 determines that the communication channel change request has been received, the controller 170 changes a communication channel set in the communicator 130 to a communication channel represented by the communication channel change request (Step S107).

After Step S107, the controller 170 determines whether or not image data is prepared by determining whether or not the image processing circuit 120 notified of a ready interrupt (Step S108).

In a case in which the controller 170 determines that the image data is not prepared in Step S108, the determination of Step S106 is repeated. On the other hand, in a case in which the controller 170 determines that the image data is prepared in Step S108, the process of Step S103 is executed.

The process of Step S102 to Step S105 and the process of Step S108 are not essential. The transmitted data is not limited to image data. Music data or the like may be transmitted.

Figure 5:
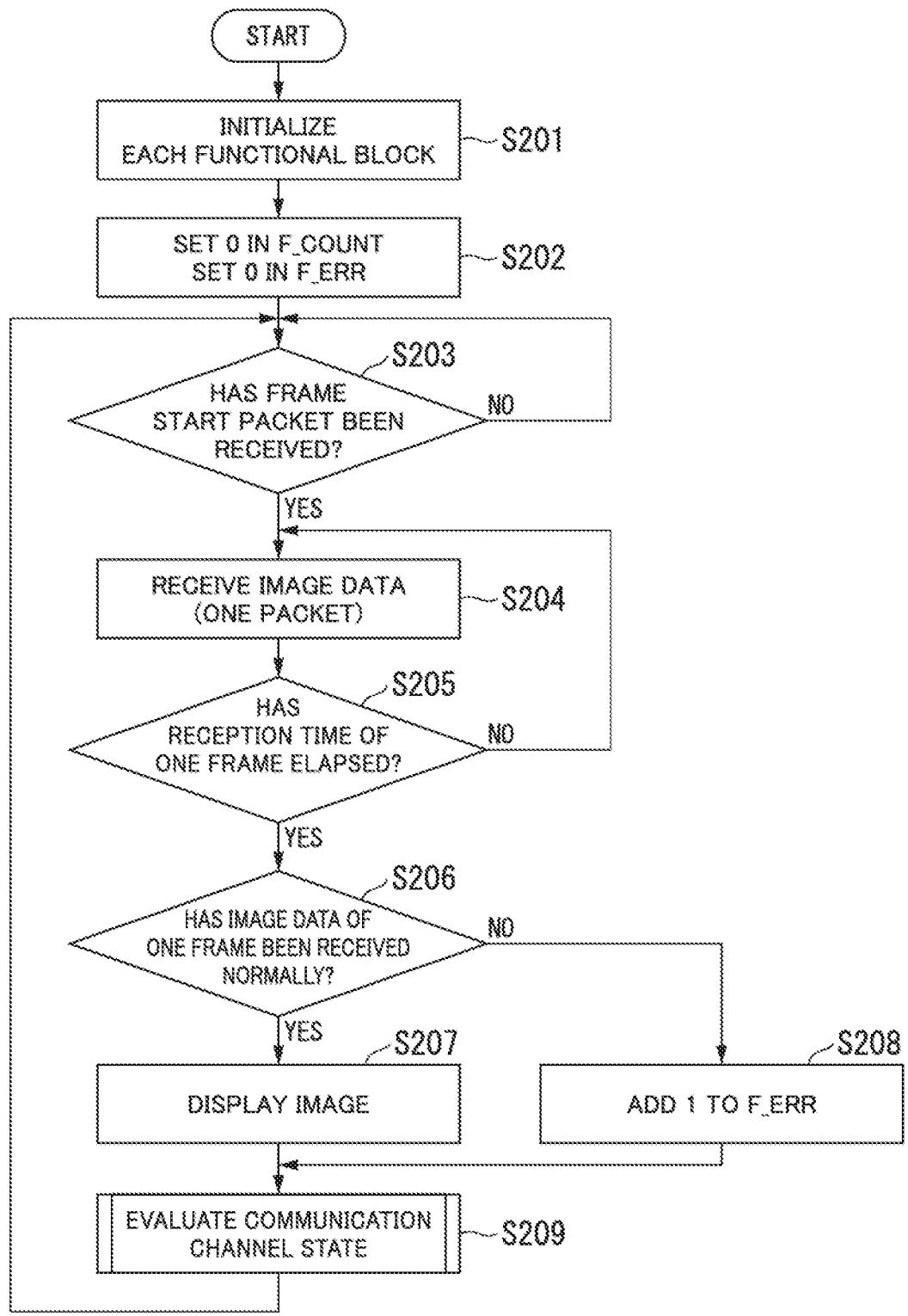
FIG. 5 is a flowchart showing the procedure of an operation of a receiver according to the first embodiment of the present invention.

The operation of the receiver 201 will be described. FIG. 5 shows the procedure of the operation of the receiver 201.

When power is supplied to the receiver 201, the controller 260 initializes each functional block (Step S201). In Step S201, the controller 260 initializes the settings of communication channels in the first communicator 220 and the second communicator 221. In this way, a predetermined communication channel is set in the first communicator 220 and the second communicator 221. For example, a communication channel set in the first communicator 220 and a communication channel set in the second communicator 221 are different from each other. In a plurality of receivers, a common communication channel may be set as a communication channel used for communication of the communication channel information. In a case in which communication of image data and communication of communication channel information are executed at different timings, the same communication channel may be set in the first communicator 220 and the second communicator 221.

After Step S201, the controller 260 sets a variable F_COUNT and a variable F_ERR to 0 (Step S202). The variable F_COUNT and the variable F_ERR are variables used for calculating a frame error rate. The variable F_COUNT represents the number of frames of received image data. The variable F_ERR represents the number of times the reception of image data of one frame has not been completed within a predetermined time. In other words, the variable F_ERR represents the number of frame errors.

After Step S202, the controller 260 monitors the first communicator 220. In a case in which a frame start packet is transmitted from the transmitter 101, the controller 260 receives the frame start packet from the transmitter 101 by using the first communicator 220. The controller 260 determines whether or not a frame start packet has been received (Step S203).

In a case in which the controller 260 determines that the frame start packet has not been received in Step S203, the determination of Step S203 is repeated. On the other hand, in a case in which the controller 260 determines that the frame start packet has been received in Step S203, the controller 260 receives image data of one packet from the transmitter 101 by using the first communicator 220 (Step S204).

After Step S204, the controller 260 determines whether or not a reception time of one frame has elapsed from a timing at which the frame start packet was received (Step S205).

In a case in which the controller 260 determines that the reception time of one frame has not elapsed in Step S205, the process of Step S204 is executed. On the other hand, in a case in which the controller 260 determines that the reception time of one frame has elapsed in Step S205, the controller 260 determines whether or not image data of one frame has been received normally (Step S206).

A serial number is added to individual image data or a packet including the image data transmitted from the transmitter 101. A flag indicating final data is added to final image data within one frame or a packet including the image data. In Step S206, the controller 260 determines whether or not there is missing image data on the basis of serial numbers and flags. In a case in which there is no missing image data, the controller 260 determines that the image data of one frame has been received normally. On the other hand, in a case in which there is missing image data, the controller 260 determines that image data of one frame has not been received normally.

In a case in which the controller 260 determines that the image data of one frame has been received normally in Step S206, the controller 260 notifies the image processing circuit 230 of the completion of reception and outputs the image data to the image processing circuit 230. The image processing circuit 230 expands the image data and outputs the expanded image data to the monitor 301. The monitor 301 displays an image on the basis of the image data (Step S207).

In a case in which the controller 260 determines that the image data of one frame has not been received normally in Step S206, the controller 260 adds one to the variable F_ERR (Step S208).

After Step S207 or Step S208, a communication channel state evaluation (Step S209) is executed. Details of the process of Step S209 will be described later. After Step S209, the process of Step S203 is executed.

The process of Step S202 to Step S208 is not essential. After the process of Step S201 is executed, the process of Step S209 may be executed for every predetermined period.

Figure 6:
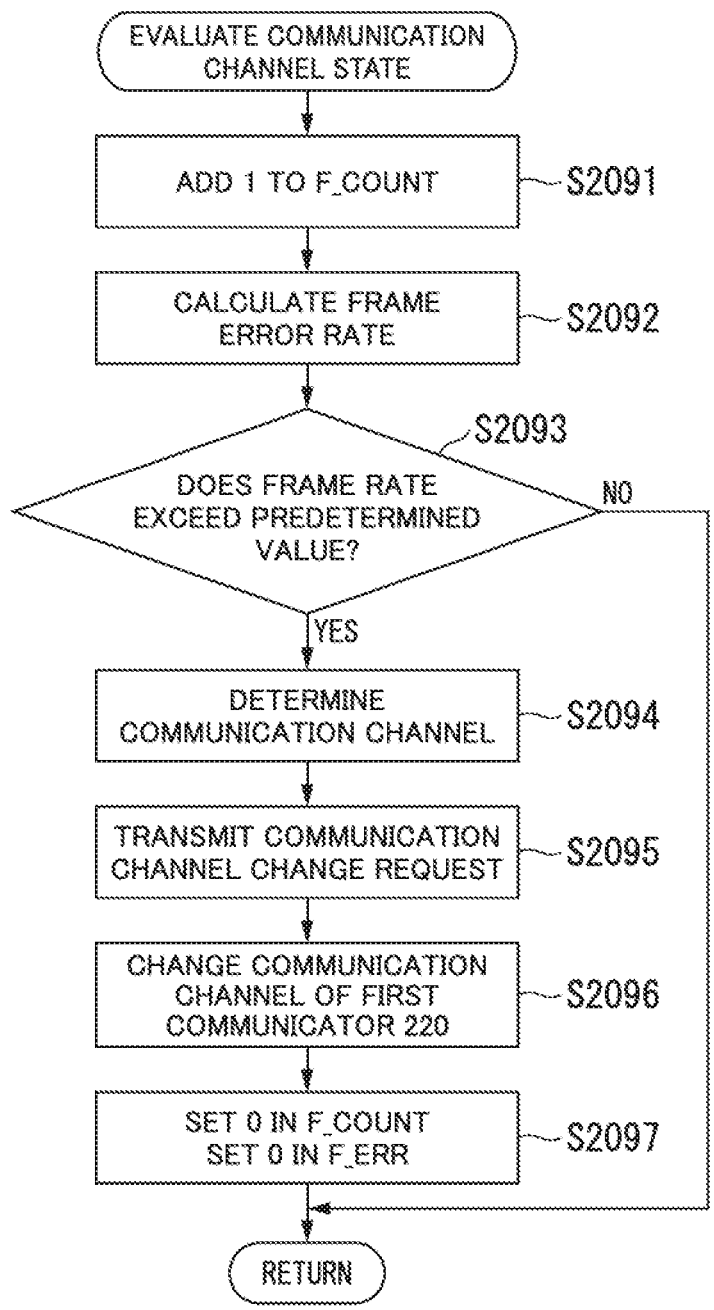
FIG. 6 is a flowchart showing the procedure of an operation of a receiver according to the first embodiment of the present invention.

FIG. 6 shows details of a communication channel state evaluation performed in Step S209.

The controller 260 adds one to the variable F_COUNT (Step S2091). After Step S2091, the controller 260 calculates a frame error rate by calculating "F_ERR/F_COUNT" (Step S2092).

After Step S2092, the controller 260 determines whether or not the frame error rate calculated in Step S2092 exceeds a predetermined value (Step S2093).

In a case in which the controller 260 determines that the frame error rate does not exceed the predetermined value in Step S2093, the process shown in FIG. 6 ends. On the other hand, in a case in which the controller 260 determines that the frame error rate exceeds the predetermined value in Step S2093, the controller 260 determines a communication channel to be used for communication of the image data (Step S2094).

In Step S2094, the controller 260 determines to use a communication channel having a highest priority level among communication channels included in the communication channel priority table. The communication channel priority table will be described later. In this way, in a case in which the state of the communication channel used for communication of image data is estimated to deteriorate, the controller 260 determines a new communication channel.

After Step S2094, the controller 260 transmits a communication channel change request to the transmitter 101 by using the first communicator 220 (Step S2095). The communication channel change request includes the information of the communication channel determined in Step S2094.

After Step S2095, the controller 260 changes a communication channel set in the first communicator 220 to the communication channel determined in Step S2094 (Step S2096).

After Step S2096, the controller 260 sets the variable F_COUNT and the variable F_ERR to "0" (Step S2097). When the process of Step S2097 is executed, the process shown in FIG. 6 ends.

The process of Step S2091 and Step S2097 is not essential. A criterion used for determining whether or not a communication channel is to be changed is not limited to the frame error rate.

Figure 7:
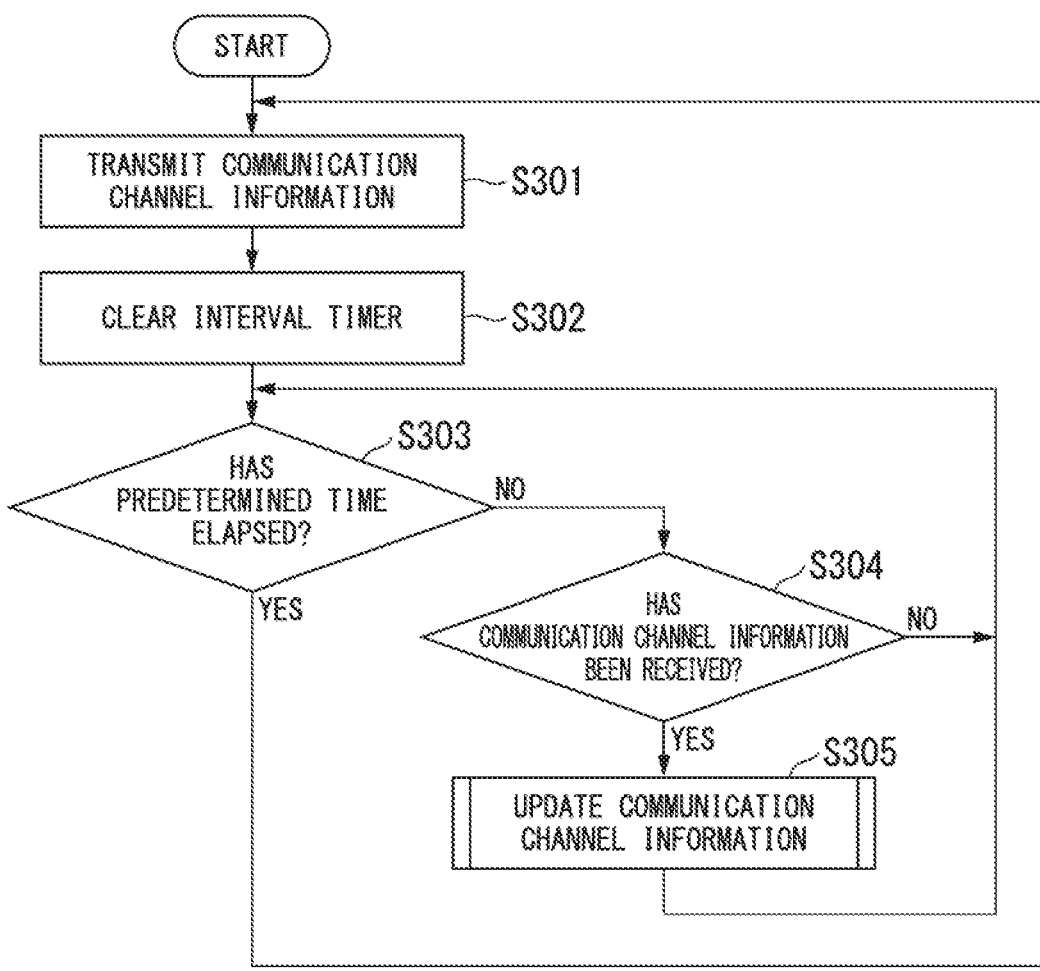
FIG. 7 is a flowchart showing the procedure of an operation of a receiver according to the first embodiment of the present invention.

FIG. 7 shows the procedure of the operation of the receiver 201 that is executed in parallel with the operations shown in FIGS. 5 and 6.

The controller 260 transmits communication channel information to the other receivers (first terminals) by using the second communicator 221 (Step S301). The communication channel information transmitted in Step S301 includes the information of the communication channel set in the first communicator 220 of the receiver 201. In other words, the communication channel information transmitted from the receiver 201 includes the information of the communication channel used for communication of image data by the receiver 201. In a case in which communication channel information is received from the other receivers, the communication channel information transmitted in Step S301 also includes the information of a communication channel set in the communicator of the other receiver. In other words, the communication channel information transmitted from the receiver 201 also includes the information of a communication channel used for communication of image data by the other receiver.

After Step S301, the controller 260 clears an interval timer (Step S302). The interval timer is used by the receiver 201 to transmit communication channel information at predetermined time intervals. After the interval timer is cleared, the interval timer starts measurement of a time.

After Step S302, the controller 260 determines whether or not the time measured by the interval timer has exceeded a predetermined time (Step S303).

In a case in which the controller 260 determines that the time measured by the interval timer has exceeded the predetermined time in Step S303, the process of Step S301 is executed. Accordingly, the controller 260 transmits the communication channel information to the other receivers at predetermined time intervals.

On the other hand, in a case in which the controller 260 determines that the time measured by the interval timer has not exceeded the predetermined time in Step S303, the controller 260 monitors the second communicator 221. In a case in which communication channel information has been transmitted from another receiver, the controller 260 receives the communication channel information by using the second communicator 221. The controller 260 determines whether or not the communication channel information has been received (Step S304).

In a case in which the controller 260 determines that the communication channel information has not been received in Step S304, the process of Step S303 is executed. On the other hand, in a case in which the controller 260 determines that the communication channel information has been received in Step S304, communication channel information update (Step S305) is executed. Details of the process of Step S305 will be described later. After Step S305, the process of Step S303 is executed.

The transmission of communication channel information for every predetermined time is not essential. For example, communication channel information may be transmitted when the communication channel information is received from another receiver.

Figure 8:
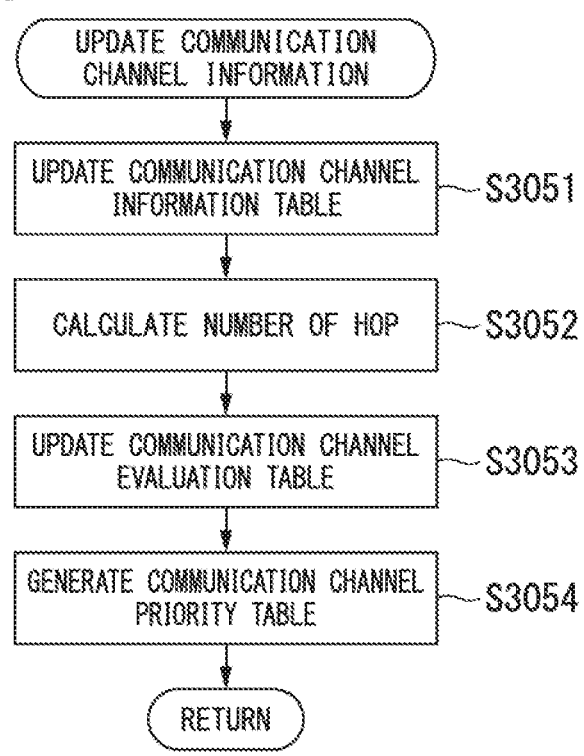
FIG. 8 is a flowchart showing the procedure of an operation of a receiver according to the first embodiment of the present invention.

FIG. 8 shows details of communication channel information update in Step S305.

The controller 260 updates a communication channel information table on the basis of the received communication channel information (Step S3051). The RAM 250 stores the communication channel information table including information of communication channels used by the receiver 201 and the other receivers. In Step S3051, the controller 260 records information included in the received communication channel information in the communication channel information table. The communication channel information table will be described later.

After Step S3051, the controller 260 calculates the hop number for each receiver disposed in the vicinity of the receiver 201 on the basis of the communication channel information table and updates a hop number table (Step S3052). The hop number is the number of sections through which communication channel information transmitted from another receiver passes before the communication channel information is received by the receiver 201. Each of the sections is composed of a communication route between a transmission terminal transmitting communication channel information and a reception terminal receiving the communication channel information from the transmission terminal.

For example, the communication channel information that has transmitted from the second terminal is received by the first terminal. The communication channel information received by the first terminal is transmitted from the first terminal to the receiver 201. The receiver 201 receives the communication channel information from the first terminal. In this case, two sections are present between the second terminal and the receiver 201. For this reason, the hop number of the second terminal is "2." One section is present between the first terminal and the receiver 201. For this reason, the hop number of the first terminal is "1."

The RAM 250 stores the hop number table. In Step S3052, the controller 260 records the calculated hop numbers in the hop number table. The hop number table will be described later.

After Step S3052, the controller 260 updates the communication channel evaluation table on the basis of the communication channel information table and the hop number table (Step S3053). The RAM 250 stores the communication channel evaluation table including information of the degree of interference of each communication channel. In Step S3053, the controller 260 calculates the degree of interference for each communication channel and records the calculated degree of interference in the communication channel evaluation table. The communication channel evaluation table will be described later.

After Step S3053, the controller 260 generates a communication channel priority table on the basis of the communication channel evaluation table (Step S3054). The RAM 250 stores the communication channel priority table including information of a priority level of each communication channel based on the degree of interference. The communication channel priority table will be described later. When the process of Step S3054 is executed, the process shown in FIG. 8 ends.

The reception of the communication channel information will be described. The communication channel information is transmitted between receivers by using a packet relay system.

Figure 9:
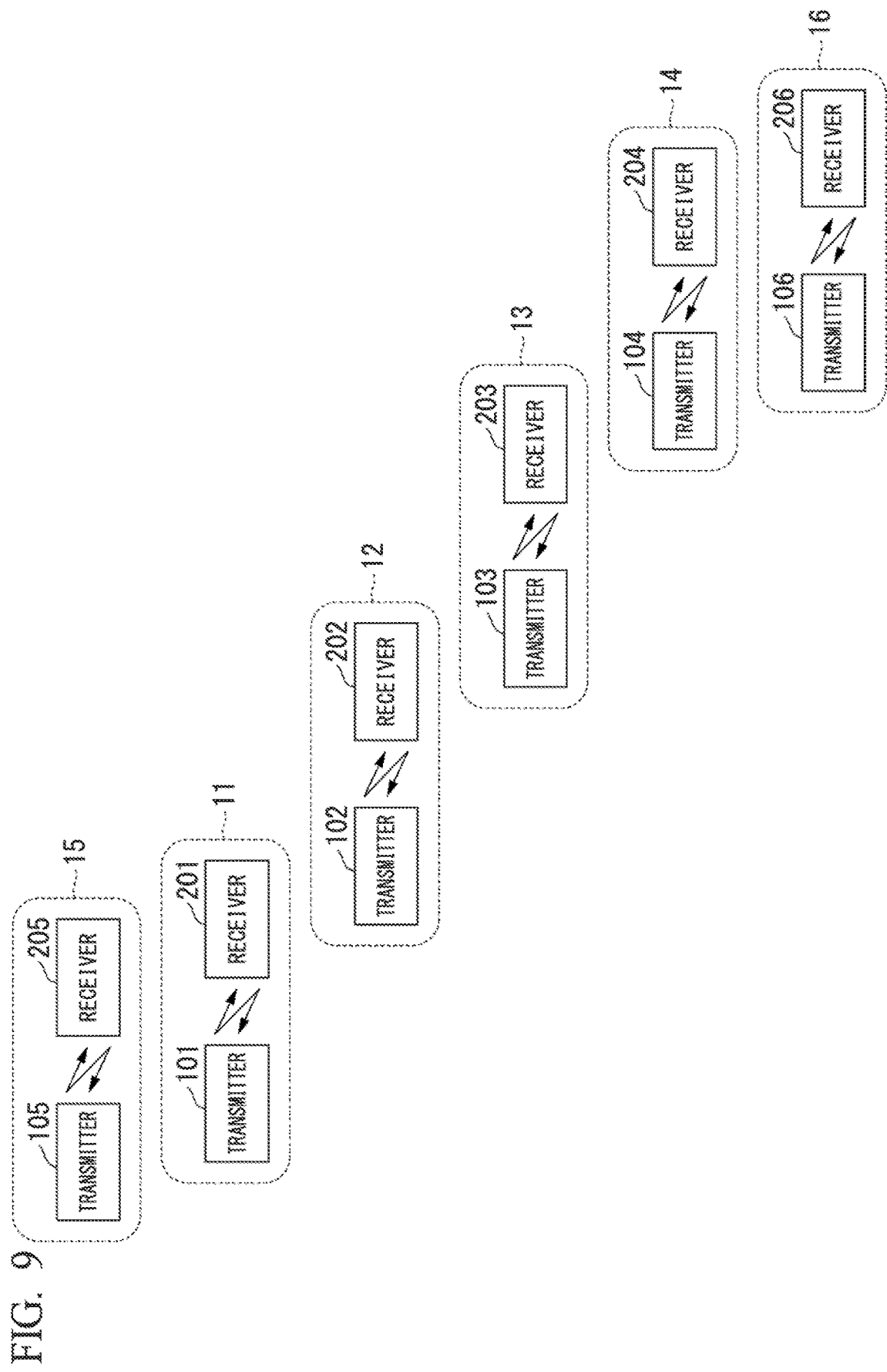
FIG. 9 is a diagram showing an example in which a plurality of image communication systems are disposed in the first embodiment of the present invention.

FIG. 9 shows an example in which a plurality of image communication systems are disposed. As shown in FIG. 9, six image communication systems 11, 12, 13, 14, 15, 16 are disposed. The image communication system 11 includes a transmitter 101 and a receiver 201. The image communication system 12 includes a transmitter 102 and a receiver 202. The image communication system 13 includes a transmitter 103 and a receiver 203. The image communication system 14 includes a transmitter 104 and a receiver 204. The image communication system 15 includes a transmitter 105 and a receiver 205. The image communication system 16 includes a transmitter 106 and a receiver 206.

Figure 10:
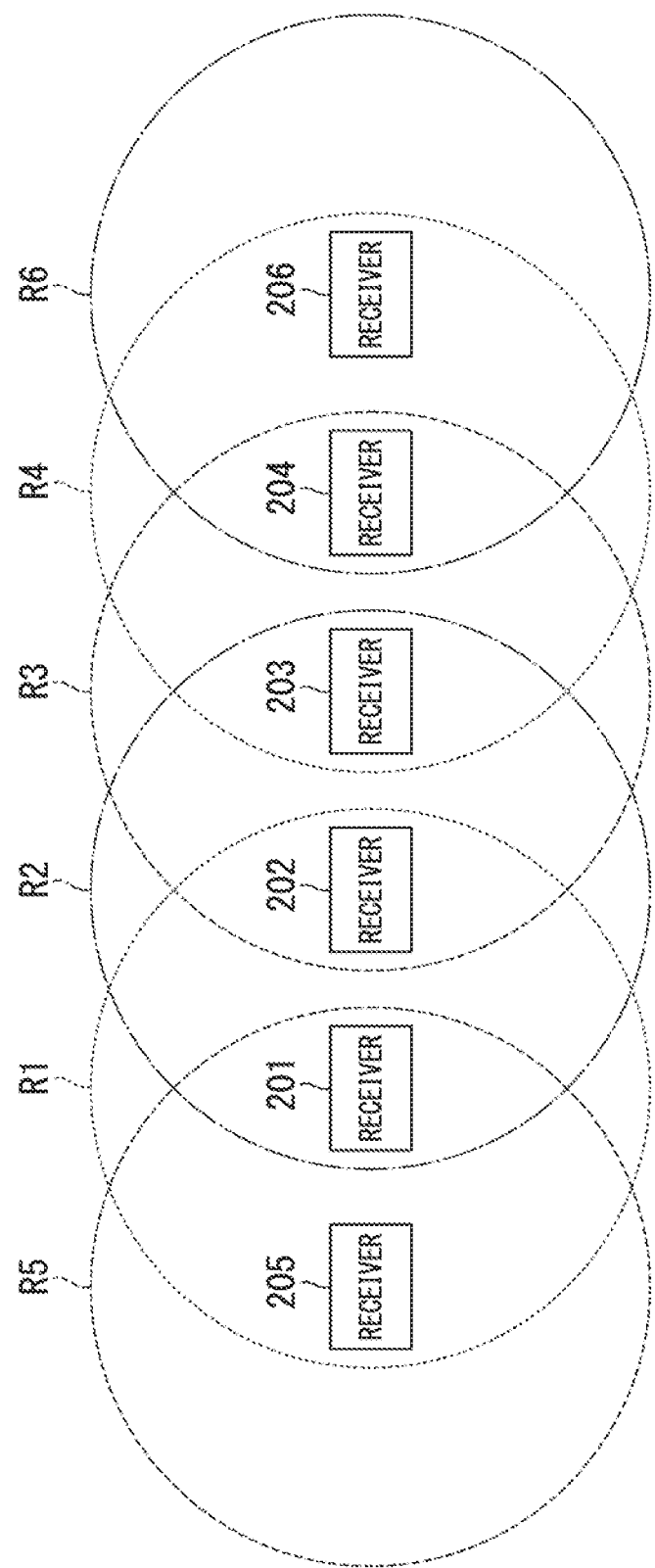
FIG. 10 is a diagram showing a communicable range of a receiver of each image transmission system according to the first embodiment of the present invention.

FIG. 10 shows a communicable range of the receiver of each image communication system. Although each image communication system is composed of a transmitter and a receiver, for the simplification of the drawing, only receivers are shown.

A range R1 is a range in which the receiver 201 is able to communicate. A range R2 is a range in which the receiver 202 is able to communicate. A range R3 is a range in which the receiver 203 is able to communicate. A range R4 is a range in which the receiver 204 is able to communicate. A range R5 is a range in which the receiver 205 is able to communicate. A range R6 is a range in which the receiver 206 is able to communicate.

The receiver 201 is able to communicate with only the receiver 202 (first terminal) and the receiver 205 (first terminal). The receiver 202 is able to communicate with only the receiver 201 and the receiver 203 (second terminal). The receiver 203 is able to communicate with only the receiver 202 and the receiver 204. The receiver 204 is able to communicate with only the receiver 203 and the receiver 206. The receiver 205 is able to communicate with only the receiver 201. The receiver 206 is able to communicate with only the receiver 204.

Figure 11:
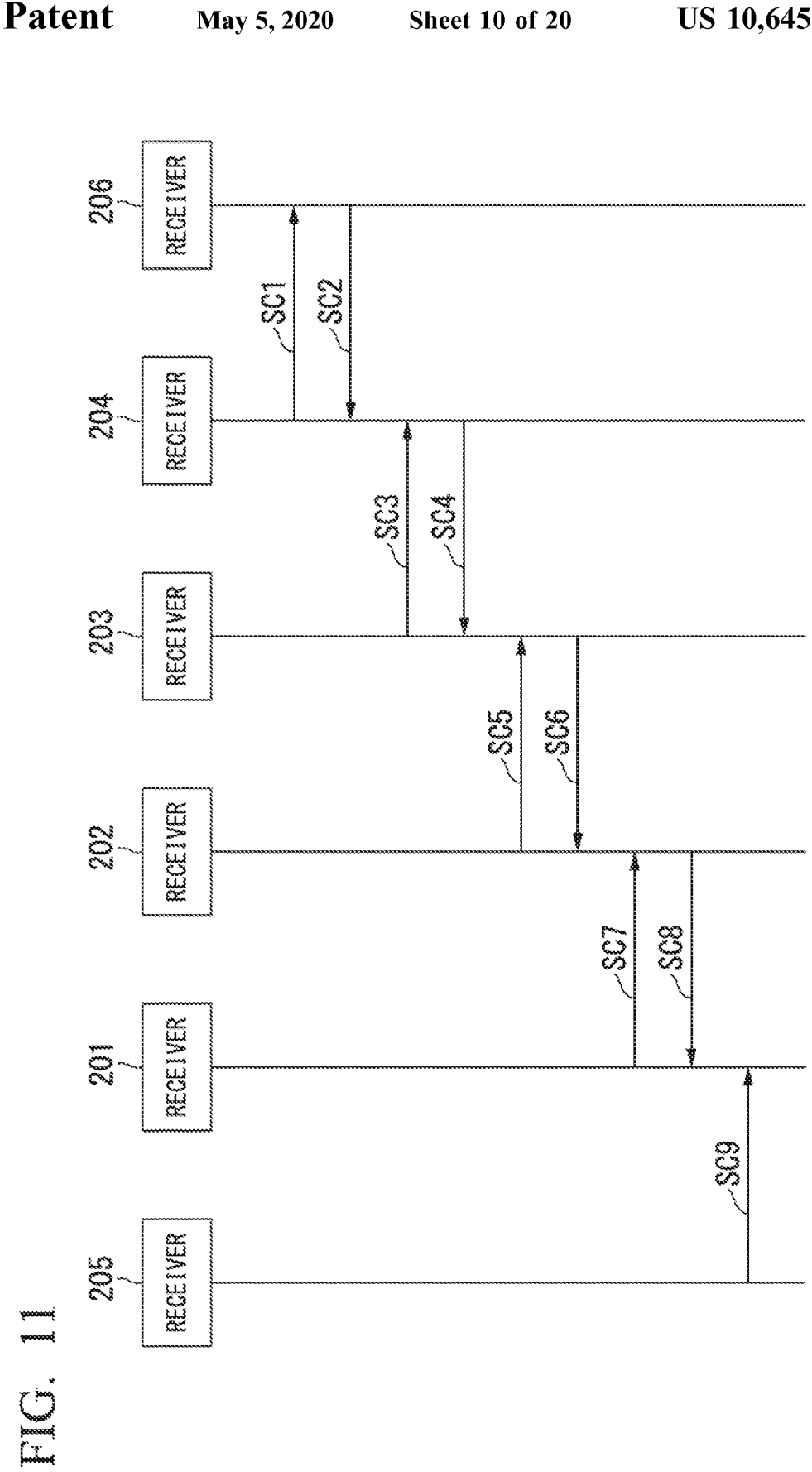
FIG. 11 is a diagram showing a communication sequence of communication channel information according to the first embodiment of the present invention.

FIG. 11 shows a communication sequence of communication channel information. The communication channel information is transmitted from the receiver 204 to the receiver 206 (Step SC1), and the communication channel information is transmitted from the receiver 206 to the receiver 204 (Step SC2). Thereafter, the communication channel information is transmitted from the receiver 203 to the receiver 204 (Step SC3), and the communication channel information is transmitted from the receiver 204 to the receiver 203 (Step SC4).

Thereafter, the communication channel information is transmitted from the receiver 202 to the receiver 203 (Step SC5), and the communication channel information is transmitted from the receiver 203 to the receiver 202 (Step SC6). Thereafter, the communication channel information is transmitted from the receiver 201 to the receiver 202 (Step SC7), and the communication channel information is transmitted from the receiver 202 to the receiver 201 (Step SC8). Thereafter, the communication channel information is transmitted from the receiver 205 to the receiver 201 (Step SC9). The communication channel information transmitted from the receiver 201 to the receiver 205 is not shown.

FIG. 12 shows communication channel information transmitted from the receiver 206 to the receiver 204 in Step SC2. The communication channel information includes first communication channel information, second communication channel information, and third communication channel information.

The first communication channel information includes information of a communication channel in a terminal that has transmitted the communication channel information. The first communication channel information includes a terminal name and information of a communication channel used for communication of image data by a terminal having the terminal name. The first communication channel information shown in FIG. 12 includes information of a communication channel CH2 used by the receiver 206.

The second communication channel information includes information of a communication channel in a terminal with which the terminal that has transmitted the communication channel information is able to directly communicate. The second communication channel information includes a terminal name, information of a communication channel used for communication of image data by a terminal having the terminal name, and route information. The route information includes a terminal name of a terminal (transmission source) that has first transmitted information included in the second communication channel information and a terminal name of a terminal (transmission destination) that has first received information included in the second communication channel information. In other words, in a case in which a route in which communication channel information is transmitted includes a plurality of sections, information of terminals of the first section is included in the route information.

The second communication channel information shown in FIG. 12 includes information of a communication channel CH5 used by the receiver 204. The information is the first communication channel information transmitted from the receiver 204 to the receiver 206 in Step SC1. For this reason, the second communication channel information shown in FIG. 12 includes information of the receiver 204 that is a transmission source and the receiver 206 that is a transmission destination. In this way, the receiver 206 transmits the first communication channel information received from the receiver 204 to the receiver 204 as second communication channel information.

Third communication channel information includes information of a communication channel other than the first communication channel information and the second communication channel information. The third communication channel information includes information of a communication channel of another terminal that is transmitted from a terminal with which the terminal that has transmitted the communication channel information is able to directly communicate. The third communication channel information includes a terminal name, information of a communication channel used for communication of image data by a terminal having the terminal name, and route information. The route information includes a terminal name of a terminal (transmission source) that has first transmitted information included in the third communication channel information and a terminal name of a terminal (transmission destination) that has first received information included in the third communication channel information. The communication channel information shown in FIG. 12 does not include the third communication channel information.

FIG. 13 shows communication channel information transmitted from the receiver 204 to the receiver 203 in Step SC4. First communication channel information shown in FIG. 13 includes information of a communication channel CH5 used by the receiver 204.

Second communication channel information shown in FIG. 13 includes information of a communication channel CH2 used by the receiver 206. The information is first communication channel information transmitted from the receiver 206 to the receiver 204 in Step SC2. For this reason, the second communication channel information includes information of the receiver 206 that is a transmission source and the receiver 204 that is a transmission destination. In this way, the receiver 204 transmits the first communication channel information received from the receiver 206 to the receiver 203 as the second communication channel information.

The second communication channel information shown in FIG. 13 includes information of a communication channel CH3 used by the receiver 203. The information is the first communication channel information transmitted from the receiver 203 to the receiver 204 in Step SC3. For this reason, the second communication channel information shown in FIG. 13 includes information of the receiver 203 that is a transmission source and the receiver 204 that is a transmission destination. In this way, the receiver 204 transmits the first communication channel information received from the receiver 203 to the receiver 203 as the second communication channel information.

The third communication channel information shown in FIG. 13 includes information of a communication channel CH5 used by the receiver 204. The information is the first communication channel information transmitted from the receiver 204 to the receiver 206 in Step SC1 and is the second communication channel information transmitted from the receiver 206 to the receiver 204 in Step SC2. For this reason, the third communication channel information shown in FIG. 13 includes information of the receiver 204 that is a transmission source and the receiver 206 that is a transmission destination. In this way, the receiver 204 transmits the second communication channel information received from the receiver 206 to the receiver 203 as the third communication channel information.

FIG. 14 shows communication channel information transmitted from the receiver 203 to the receiver 202 in Step SC6. First communication channel information shown in FIG. 14 includes information of a communication channel CH3 used by the receiver 203.

Second communication channel information shown in FIG. 14 includes information of a communication channel CH5 used by the receiver 204. The information is the first communication channel information transmitted from the receiver 204 to the receiver 203 in Step SC4. For this reason, the second communication channel information shown in FIG. 14 includes information of the receiver 204 that is a transmission source and the receiver 203 that is a transmission destination. In this way, the receiver 203 transmits the first communication channel information received from the receiver 204 to the receiver 202 as the second communication channel information.

The second communication channel information shown in FIG. 14 includes information of a communication channel CH2 used by the receiver 202. The information is the first communication channel information transmitted from the receiver 202 to the receiver 203 in Step SC5. For this reason, the second communication channel information shown in FIG. 14 includes information of the receiver 202 that is a transmission source and the receiver 203 that is a transmission destination. In this way, the receiver 203 transmits the first communication channel information received from the receiver 202 to the receiver 202 as the second communication channel information.

The third communication channel information shown in FIG. 14 includes information of a communication channel CH2 used by the receiver 206. The information is the first communication channel information transmitted from the receiver 206 to the receiver 204 in Step SC2 and is the second communication channel information transmitted from the receiver 204 to the receiver 203 in Step SC4. For this reason, the third communication channel information shown in FIG. 14 includes information of the receiver 206 that is a transmission source and the receiver 204 that is a transmission destination. In this way, the receiver 203 transmits the second communication channel information received from the receiver 204 to the receiver 202 as the third communication channel information.

The third communication channel information shown in FIG. 14 includes information of a communication channel CH3 used by the receiver 203. The information is the first communication channel information transmitted from the receiver 203 to the receiver 204 in Step SC3 and is the second communication channel information transmitted from the receiver 204 to the receiver 203 in Step SC4. For this reason, the third communication channel information shown in FIG. 14 includes information of the receiver 203 that is a transmission source and the receiver 204 that is a transmission destination.

The third communication channel information shown in FIG. 14 includes information of a communication channel CH5 used by the receiver 204. The information is the first communication channel information transmitted from the receiver 204 to the receiver 206 in Step SC1 and is the second communication channel information transmitted from the receiver 206 to the receiver 204 in Step SC2. In addition, the information is the third communication channel information transmitted from the receiver 204 to the receiver 203 in Step SC4. For this reason, the third communication channel information shown in FIG. 14 includes information of the receiver 204 that is a transmission source and the receiver 206 that is a transmission destination. In this way, the receiver 203 transmits the third communication channel information received from the receiver 204 to the receiver 202 as the third communication channel information.

FIG. 15 shows communication channel information transmitted from the receiver 202 to the receiver 201 in Step SC8. First communication channel information shown in FIG. 15 includes information of a communication channel CH2 used by the receiver 202.

Second communication channel information shown in FIG. 15 includes information of a communication channel CH3 used by the receiver 203. The information is the first communication channel information transmitted from the receiver 203 to the receiver 202 in Step SC6. For this reason, the second communication channel information shown in FIG. 15 includes information of the receiver 203 that is a transmission source and the receiver 202 that is a transmission destination. In this way, the receiver 202 transmits the first communication channel information received from the receiver 203 to the receiver 201 as the second communication channel information.

The second communication channel information shown in FIG. 15 includes information of a communication channel CH1 used by the receiver 201. The information is the first communication channel information transmitted from the receiver 201 to the receiver 202 in Step SC7. For this reason, the second communication channel information shown in FIG. 15 includes information of the receiver 201 that is a transmission source and the receiver 202 that is a transmission destination. In this way, the receiver 202 transmits the first communication channel information received from the receiver 201 to the receiver 201 as the second communication channel information.

The third communication channel information shown in FIG. 15 includes information of a communication channel CH5 used by the receiver 204. The information is the first communication channel information transmitted from the receiver 204 to the receiver 203 in Step SC4 and is the second communication channel information transmitted from the receiver 203 to the receiver 202 in Step SC6. For this reason, the second communication channel information shown in FIG. 15 includes information of the receiver 204 that is a transmission source and the receiver 203 that is a transmission destination. In this way, the receiver 202 transmits the second communication channel information received from the receiver 203 to the receiver 201 as the third communication channel information.

The third communication channel information shown in FIG. 15 includes information of a communication channel CH2 used by the receiver 202. The information is the first communication channel information transmitted from the receiver 202 to the receiver 203 in Step SC5 and is the second communication channel information transmitted from the receiver 203 to the receiver 202 in Step SC6. For this reason, the third communication channel information shown in FIG. 15 includes information of the receiver 202 that is a transmission source and the receiver 203 that is a transmission destination.

The third communication channel information shown in FIG. 15 includes information of a communication channel CH2 used by the receiver 206. The information is the first communication channel information transmitted from the receiver 206 to the receiver 204 in Step SC2 and is the second communication channel information transmitted from the receiver 204 to the receiver 203 in Step SC4. In addition, the information is the third communication channel information transmitted from the receiver 203 to the receiver 202 in Step SC6. For this reason, the third communication channel information shown in FIG. 15 includes information of the receiver 206 that is a transmission source and the receiver 204 that is a transmission destination. In this way, the receiver 202 transmits the third communication channel information received from the receiver 203 to the receiver 201 as the third communication channel information.

The third communication channel information shown in FIG. 15 includes information of a communication channel CH3 used by the receiver 203. The information is the first communication channel information transmitted from the receiver 203 to the receiver 204 in Step SC3 and is the second communication channel information transmitted from the receiver 204 to the receiver 203 in Step SC4. In addition, the information is the third communication channel information transmitted from the receiver 203 to the receiver 202 in Step SC6. For this reason, the third communication channel information shown in FIG. 15 includes information of the receiver 203 that is a transmission source and the receiver 204 that is a transmission destination.

The third communication channel information shown in FIG. 15 includes information of a communication channel CH5 used by the receiver 204. The information is the first communication channel information transmitted from the receiver 204 to the receiver 206 in Step SC1 and is the second communication channel information transmitted from the receiver 206 to the receiver 204 in Step SC2. In addition, the information is the third communication channel information transmitted from the receiver 204 to the receiver 203 in Step SC4 and is the third communication channel information transmitted from the receiver 203 to the receiver 202 in Step SC6. For this reason, the third communication channel information shown in FIG. 15 includes information of the receiver 204 that is a transmission source and the receiver 206 that is a transmission destination.

FIG. 16 shows communication channel information transmitted from the receiver 205 to the receiver 201 in Step SC9. First communication channel information shown in FIG. 16 includes information of a communication channel CH4 used by the receiver 205. The communication channel information shown in FIG. 16 does not include the second communication channel information and the third communication channel information.

FIG. 17 shows a communication channel information table maintained by the receiver 201. In Step S3051, the controller 260 records the receiver 202 with which the receiver 201 is able to directly communicate and communication channel information received from the receiver 205 in the communication channel information table. The communication channel information table shown in FIG. 17 includes the communication channel information shown in FIG. 15 and the communication channel information shown in FIG. 16. In addition, in Step S3051, the controller 260 records information of a communication channel used for communication of image data by the receiver 201 in the communication channel information table.

The communication channel information table includes a terminal name, a type, a communication channel, and route information. Terminal names, communication channels and route information relating to second communication channel information and third communication channel information are included in the communication channel information received from the other receivers. The type represents the type of communication channel information. "1" represents the first communication channel information. "2" represents the second communication channel information. "3" represents the third communication channel information.

In the communication channel information table, the first communication channel information includes information of a communication channel CH1 used by the receiver 201. In the communication channel information table, the second communication channel information includes the first communication channel information received from the receiver 202 and the receiver 205. In the communication channel information table, the third communication channel information includes the second communication channel information and the third communication channel information received from the receiver 202.

In Step S301, the controller 260 generates communication channel information including the first to third communication channel information included in the communication channel information table. The controller 260 transmits the generated communication channel information to the other receivers by using the second communicator 221.

FIG. 18 shows a hop number table maintained by the receiver 201. In Step S3052, the controller 260 detects the hop number for each receiver by retrieving route information included in the communication channel information table. The controller 260 records the detected hop numbers in the hop number table.

The hop number table includes information of a terminal name and the hop number. The number of sections through which communication channel information transmitted from a terminal represented by the terminal name passes before the communication channel information is received by the receiver 201 is recorded in the hop number table as the hop number. The receiver 201 is its own terminal, and thus the hop number of the receiver 201 is "0."

Route information RT100 shown in FIG. 17 shows a communication route from the receiver 202 to the receiver 201. The hop number of the receiver 202 based on the route information RT100 is "1."

Route information RT102 shown in FIG. 17 shows a communication route from the receiver 203 to the receiver 202. The route information RT102 and the route information RT100 represent a communication route passing through the receiver 202 from the receiver 203 to the receiver 201. The hop number of the receiver 203 based on the route information RT102 and the route information RT100 is "2."

Route information RT103 shown in FIG. 17 shows a communication route from the receiver 204 to the receiver 203. The route information RT103, the route information RT102, and the route information RT100 represent a communication route passing through the receiver 203 and the receiver 202 from the receiver 204 to the receiver 201. The hop number of the receiver 204 based on the route information RT103, the route information RT102, and the route information RT100 is "3."

Route information RT101 shown in FIG. 17 shows a communication route from the receiver 205 to the receiver 201. The hop number of the receiver 205 based on the route information RT101 is "1."

Route information RT104 shown in FIG. 17 shows a communication route from the receiver 206 to the receiver 204. The route information RT104, the route information RT103, the route information RT102, and the route information RT100 represent a communication route passing through the receiver 204, the receiver 203, and the receiver 202 from the receiver 206 to the receiver 201. The hop number of the receiver 206 based on the route information RT104, the route information RT103, the route information RT102, and the route information RT100 is "4."

FIG. 19 shows a communication channel evaluation table maintained by the receiver 201. In Step S3053, the controller 260 generates information for each communication channel on the basis of the communication channel information table and the hop number table. The controller 260 records the generated information in the communication channel evaluation table.

The communication channel information table includes information of a communication channel, information of terminals for each hop number, and a degree of interference. The information of terminals for each hop number includes the number of terminals of which the hop numbers are the same, a weighting factor, and a terminal name of a terminal using a communication channel. As the hop number increases, a distance from the receiver 201 to each terminal having the hop number increases. The degree of electric wave interference according to wireless communication performed by the terminal having the hop number is estimated to decrease, and accordingly, the weighting factor is set to be in inversely proportional to the hop number.

For example, in the communication channel evaluation table shown in FIG. 19, terminals using a communication channel CH2 are the receiver 202 of which the hop number is "1" and the receiver 206 of which the hop number is "4." The terminal of which the hop number is "1" is close to the receiver 201, and thus has a weighting factor of 100. The terminal of which the hop number is "4" is far from the receiver 201, and thus has a weighting factor of 10. In addition, a weighting factor for a terminal of which the hop number is "2" is 50, and a weighting factor for a terminal of which the hop number is 3 is 20. The weighting factors are not limited to those of the example shown in FIG. 19.

FIG. 20 shows a weighting factor table maintained by the receiver 201. The weighting factor table includes the hop number and the weighting factor. The hop number from 1 to 4 and a weighting factor corresponding to each hop number are set in the weighting factor table. The RAM 250 stores the weighting factor table. In Step S3053, the controller 260 refers to the weighting factor table and records weighting factors set in the weighting factor table in the communication channel evaluation table.

In Step S3053, the controller 260 estimates a degree of interference for each communication channel on the basis of the number of terminals and the weighting factor for each hop number in the communication channel evaluation table. More specifically, the controller 260 estimates the degree of interference by using Equation (1).

$$Ic = N1 \times C1 + N2 \times C2 + \ldots + Nn \times Cn \quad (1)$$

Equation (1) represents an estimated value Ic of the degree of interference for each communication channel. In Equation (1), Nk (here, k=1, 2, ..., n) represents the number of terminals of which the hop number is k. In addition, Ck (k=1, 2, ..., n) represents a weighting factor corresponding to the hop number k. As the value calculated by using Equation (1) increases, the degree of interference for the communication channel increases.

For example, for a communication channel CH2 shown in FIG. 19, the number of terminals of which the hop number is "1" is "1," and the weighting factor corresponding to the hop number "1" is "100." The number of terminals of which the hop number is "2" is "0," and the weighting factor corresponding to the hop number "2" is "50." The number of terminals of which the hop number is "3" is "0," and the weighting factor corresponding to the hop number "3" is "20." The number of terminals of which the hop number is "4" is "1," and the weighting factor corresponding to the hop number "4" is "10." Accordingly, the degree of interference for the communication channel CH2 is acquired as 110 in accordance with Equation (2).

$$1 \times 100 + 0 \times 50 + 0 \times 20 + 1 \times 10 = 110 \quad (2)$$

FIG. 21 shows a communication channel priority table maintained by the receiver 201. The communication channel priority table includes priority levels of 1 to 4 and a communication channel corresponding to each priority level. As the value of the priority level is smaller, the priority level is higher. In Step S3054, the controller 260 refers to the communication channel evaluation table and extracts communication channels in order of lowest to highest degree of interference in the communication channel evaluation table.

In the example of the communication channel evaluation table shown in FIG. 19, the degree of interference for a communication channel CH2 is 110, and the degree of interference for the communication channel CH3 is 50. In addition, the degree of interference for a communication channel CH4 is 100, and the degree of interference for the communication channel CH5 is 20. Accordingly, the degree of interference for the communication channel CH5 is the lowest, and the degree of interference for the communication channel CH2 is the highest. The controller 260 sequentially selects the communication channel CH5, the communication channel CH3, the communication channel CH4, and the communication channel CH2 and records such information in the communication channel priority table. A communication channel CH1 that is used by the receiver 201 is a not a target for each process described above.

In Step S2094, the controller 260 determines a communication channel used for communication of image data when the state of the communication channel CH1 deteriorates on the basis of the communication channel priority table. In the communication channel priority table shown in FIG. 21, the priority level of the communication channel CH5 is the highest. For this reason, the controller 260 determines to use the communication channel CH5 for communication of image data.

In the example described above, the controller 260 determines to use a communication channel for which the estimated degree of interference is the lowest for communication of image data. In a case in which the estimated degree of interference includes a first degree of interference and a second degree of interference, and the first degree of interference is lower than the second degree of interference, the controller 260 determines to use a communication channel corresponding to the first degree of interference for communication of image data. The communication channel used for the communication of image data is not limited to a communication channel having the lowest estimated degree of interference. For example, in a case in which a plurality of degrees of interference are relatively low, a communication channel corresponding to an arbitrary one of the plurality of degrees of interference may be used for communication of image data.

In a case in which there is a communication channel that is not used by any one of a plurality of terminals represented by the communication channel information, a degree of interference for the communication channel is "0" in the communication channel evaluation table. In other words, a degree of interference is lowest for a vacant channel. For this reason, in a case in which there is a vacant channel, the controller 260 determines to use the vacant channel for communication of image data.

As described above, in Step S3053, the controller 260 estimates a degree of interference for each of a plurality of communication channels by using a weighting factor for a third terminal which is using each of a plurality of communication channels having a possibility of being used by the receiver 201. The third terminal is any one of a plurality of terminals. In the system shown in FIG. 9, the third terminal is a receiver other than the receiver 201. The weighting factor is in inversely proportional to the hop number. The hop number is the number of sections through which communication channel information transmitted by the third terminal passes before the communication channel information is received by the receiver 201. Each of the sections is composed of a communication route between a transmission terminal transmitting communication channel information and a reception terminal receiving the communication channel information from the transmission terminal. Each of the transmission terminal and the reception terminal is any one of a plurality of terminals. In Step S2094, the controller 260 determines to use a communication channel having a relatively low estimated degree of interference.

In Step S3053, the controller 260 uses one communication channel included in a plurality of communication channels and calculates a first value for each communication channel and for each hop number by multiplying the number of the third terminals of which the hop numbers are the same by a weighting factor. The first value is N1×C1 or the like in Equation (1). In Step S3053, the controller 260 calculates a second value for each communication channel by adding the first values calculated for each hop number for one communication channel, thereby estimating a degree of interference. The second value is an estimated value Ic of the degree of interference in Equation (1).

In the process shown in FIG. 8, each table may be a set of data stored in the RAM 250. The process of Step S3052 is not essential. In a case in which the process of Step S3052 is not executed, for example, the degree of interference of a communication channel is represented as the number of terminals which is using the communication channel.

A wireless communication method according to each aspect of the present invention is based on operations shown in FIGS. 6 and 7. The wireless communication method according to each aspect of the present invention includes a first step and a second step executed by a wireless communication terminal (receiver 201). In the first step (Step S304), communication channel information is wirelessly received from a first terminal. The communication channel information represents a communication channel used by at least one of a plurality of terminals including a first terminal and a second terminal. The first terminal is able to directly communicate with the wireless communication terminal. The second terminal is a terminal that is able to directly communicate with the first terminal and is a terminal other than the wireless communication terminal. Communication channel information transmitted from the first terminal to the wireless communication terminal includes first information and second information. Communication channel information transmitted from the second terminal to the first terminal includes the second information. The first information represents a communication channel used by the first terminal for wireless communication. The second information represents a communication channel used by the second terminal for wireless communication. In the second step (Step S2094), a communication channel used by the wireless communication terminal for wireless communication is determined on the basis of the communication channel information.

The wireless communication method according to each aspect of the present invention need not include a process other than the process corresponding to the first step and the second step.

The transmitter 101 may execute the process shown in FIGS. 6 and 7. In such a case, the receiver 201 executes the process of Step S106 and Step S107.

As described above, the receiver 201 receives communication channel information from the first terminal with which the receiver 201 is able to directly communicate. The communication channel information includes information of a communication channel of the first terminal and information of a communication channel of the second terminal with which the first terminal is able to directly communicate. For this reason, the controller 260 can determine a communication channel used by the receiver 201 for wireless communication on the basis of communication channels used by the first terminal and the second terminal. As a result, the receiver 201 can perform satisfactory wireless communication.

The controller 260 determines to use a communication channel having a relatively low estimated degree of interference. In this way, the receiver 201 can perform satisfactory wireless communication.

Modified Example of First Embodiment

In a modified example of the first embodiment, each receiver includes only one communicator. For example, the receiver 201 includes a first communicator 220.

In a case in which a plurality of image communication systems are synchronized with each other, a plurality of receivers perform communication of communication channel information during a common period among the plurality of image communication systems. The controller 260 of the receiver 201 receives image data from the transmitter 101 by using the first communicator 220 during a first period for data communication. The controller 260 receives communication channel information from another receiver by using the first communicator 220 in a second period other than the first period. In addition, the controller 260 transmits communication channel information to another receiver by using the first communicator 220 in the second period. The second period for communication of communication channel information is the same among the plurality of communication systems.

Figure 22:
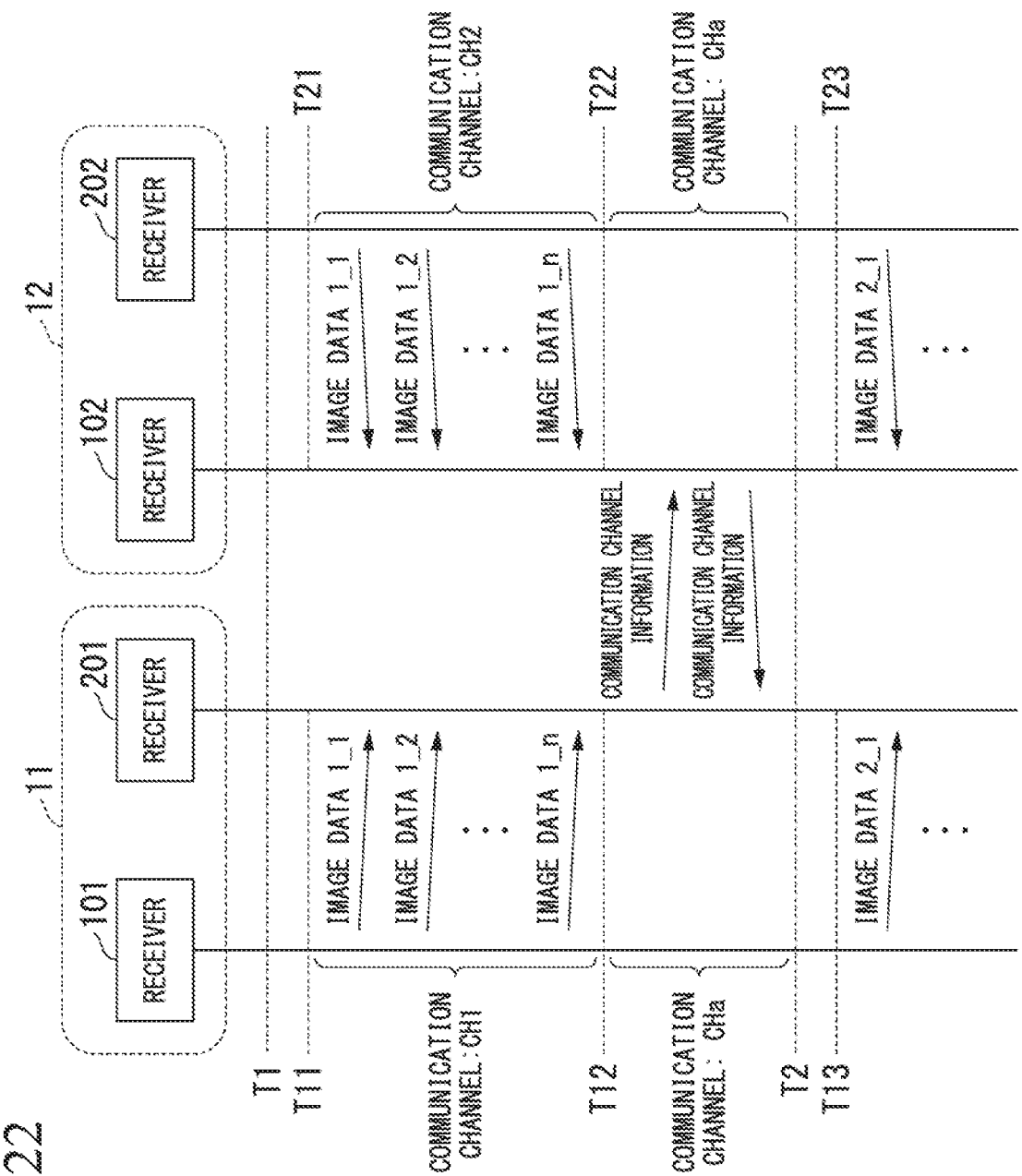
FIG. 22 is a diagram showing a communication sequence according to a modified example of the first embodiment of the present invention.

FIG. 22 shows an example of communication sequence. In FIG. 22, communications executed by devices of an image communication system 11 and an image communication system 12 are shown. The image communication system 11 includes a transmitter 101 and a receiver 201. The image communication system 12 includes a transmitter 102 and a receiver 202.

The image communication system 11 and the image communication system 12 are synchronized with each other with reference to a timing T1 and a tuning T2. At a timing T11 after the timing T1, the transmitter 101 and the receiver 201 start communication of image data by using a communication channel CH1. At a timing T21 after the timing T1, the transmitter 102 and the receiver 202 start communication of image data by using a communication channel CH2. For example, the timing T11 and the timing T21 are the same.

At a timing T12 after the timing T11, the receiver 201 switches the communication channel from the communication channel CH1 to the communication channel Cha. At a timing T22 after the timing T21, the receiver 202 switches the communication channel from the communication channel CH2 to the communication channel Cha. The receiver 201 and the receiver 202 perform communication of communication channel information by using the communication channel Cha.

At a timing T13 after the timing T12, the receiver 201 changes the communication channel. At a timing T23 after the timing T22, the receiver 202 changes the communication channel. Thereafter, communication of image data is performed in the image communication system 11 and the image communication system 12.

As described above, the receiver 201 can perform communication of image data and communication channel information by using one first communicator 220.

Second Embodiment of Present Invention

A second embodiment of the present invention will be described by using the configurations shown in FIGS. 1 to 3. In the second embodiment, the controller 260 estimates a degree of interference by using only communication channel information representing a communication channel used for wireless communication by a third terminal of which the hop number is equal to or less than "2" among the received communication channel information.

By using only communication channel information relating to the third terminal of which the hop number is equal to or less than "2," the third communication channel information may be omitted. As a result, the amount of data of packets used for communication of the communication channel information can be reduced.

Communication channel information transmitted from the first terminal to the receiver 201 includes first information and second information. Communication channel information transmitted from the second terminal to the first terminal includes the second information. The first information represents a communication channel used for wireless communication by the first terminal. The second information represents a communication channel used for wireless communication by the second terminal. The communication channel information transmitted from the first terminal to the receiver 201 does not include information representing communication channels used for wireless communication by terminals other than the first terminal and the second terminal. The communication channel information transmitted from the second terminal to the first terminal does not include information representing communication channels used for wireless communication by terminals other than the second terminal.

Points different from the first embodiment will be described by using the system shown in FIG. 9. FIG. 23 shows communication channel information received from the receiver 202 by the receiver 201. The communication channel information includes first communication channel information and second communication channel information. The communication channel information does not include the third communication channel information in the first embodiment.

The first communication channel information shown in FIG. 23 includes information of a communication channel CH2 used by the receiver 202.

The second communication channel information shown in FIG. 23 includes information of a communication channel CH3 used by the receiver 203. The information includes information of the receiver 203 that is a transmission source and the receiver 202 that is a transmission destination.

The second communication channel information shown FIG. 23 includes information of a communication channel CH1 used by the receiver 201. The information includes information of the receiver 201 that is a transmission source and the receiver 202 that is a transmission destination.

FIG. 24 shows communication channel information received from the receiver 205 by the receiver 201. The first communication channel information shown in FIG. 24 includes information of a communication channel CH4 used by the receiver 205. The communication channel information shown in FIG. 24 does not include the second communication channel information and the third communication channel information.

In Step S3051, the controller 260 records information represented in FIGS. 23 and 24 in the communication channel information table. FIG. 25 shows a communication channel information table maintained by the receiver 201. The communication channel information table shown in FIG. 25 includes the communication channel information shown in FIG. 23 and the communication channel information shown in FIG. 24. In addition, the communication channel information shown in FIG. 25 includes information of a communication channel used for communication of image data by the receiver 201.

In Step S3052, the controller 260 calculates the hop number on the basis of the communication channel information table and updates the hop number table. A method of calculating the hop number is similar to that in the first embodiment.

FIG. 26 shows the hop number table maintained by the receiver 201. Route information RT110 shown in FIG. 25 shows a communication route from the receiver 202 to the receiver 201. The hop number of the receiver 202 based on the route information RT110 is "1."

Route information RT112 shown in FIG. 25 shows a communication route from the receiver 203 to the receiver 202. The route information RT112 and the route information RT110 represents communication routes from the receiver 203 to the receiver 201 through the receiver 202. The hop number of the receiver 203 based on the route information RT112 and the route information RT110 is "2."

The route information RT111 shown in FIG. 25 represents a communication route from the receiver 205 to the receiver 201. The hop number of the receiver 205 based on the route information RT111 is "1."

In Step S3053, the controller 260 updates the communication channel evaluation table on the basis of the communication channel information table and the hop number table. A method of updating the communication channel evaluation table is similar to that in the first embodiment.

FIG. 27 shows the communication channel evaluation table maintained by the receiver 201. Information for the hop numbers 3 and 4 in the communication channel evaluation table shown in FIG. 19 does not exist in the communication channel evaluation table shown in FIG. 27.

In Step S3054, the controller 260 generates a communication channel priority table on the basis of the communication channel evaluation table. FIG. 28 shows a communication channel priority table maintained by the receiver 201. In FIG. 28, priority levels of the communication channel CH2 and the communication channel CH4 are different from those shown in FIG. 21.

In the communication channel evaluation table shown in FIG. 19, a degree of interference of the communication channel CH2 is "110." The number of terminals of which the hop number is "4" is reflected on the degree of interference of the communication channel CH2. In the communication channel evaluation table shown in FIG. 27, a degree of interference of the communication channel CH2 is "100." Since no information for the hop number of 4 is included, the degree of interference of the communication channel CH2 decreases. As a result, the priority level of the communication channel CH2 becomes high. Since the degrees of interference of the communication channel CH2 and the communication channel CH4 are the same, the priority levels of the communication channel CH2 and the communication channel CH4 may be the same in FIG. 28.

As described above, only information of communication channels relating to the third terminals of which the hop number is equal to or less than "2" is used, and thus the amount of data of packets used for communication of the communication channel information can be reduced.

Third Embodiment of the Present Invention

A third embodiment of the present invention will be described by using the configurations shown in FIGS. 1 to 3. In the third embodiment, the controller 260 determines whether or not there is a communication channel that is not used by any one of a plurality of terminals on the basis of communication channel information. In a case in which the controller 260 determines that there is no communication channel that is not used by any one of the plurality of terminals, the controller 260 determines to use a communication channel of which an estimated degree of interference is relatively low among communication channels used by first terminals with which the receiver 201 is able to directly communicate.

In a case in which a communication channel used by the first terminal with which the receiver 201 is able to directly communicate is used by the receiver 201, carrier sense multiple access/collision avoidance (CSMA/CA) effectively operates. The CSMA/CA is a function for realizing collision avoidance of electric waves.

Figures 29, 30:
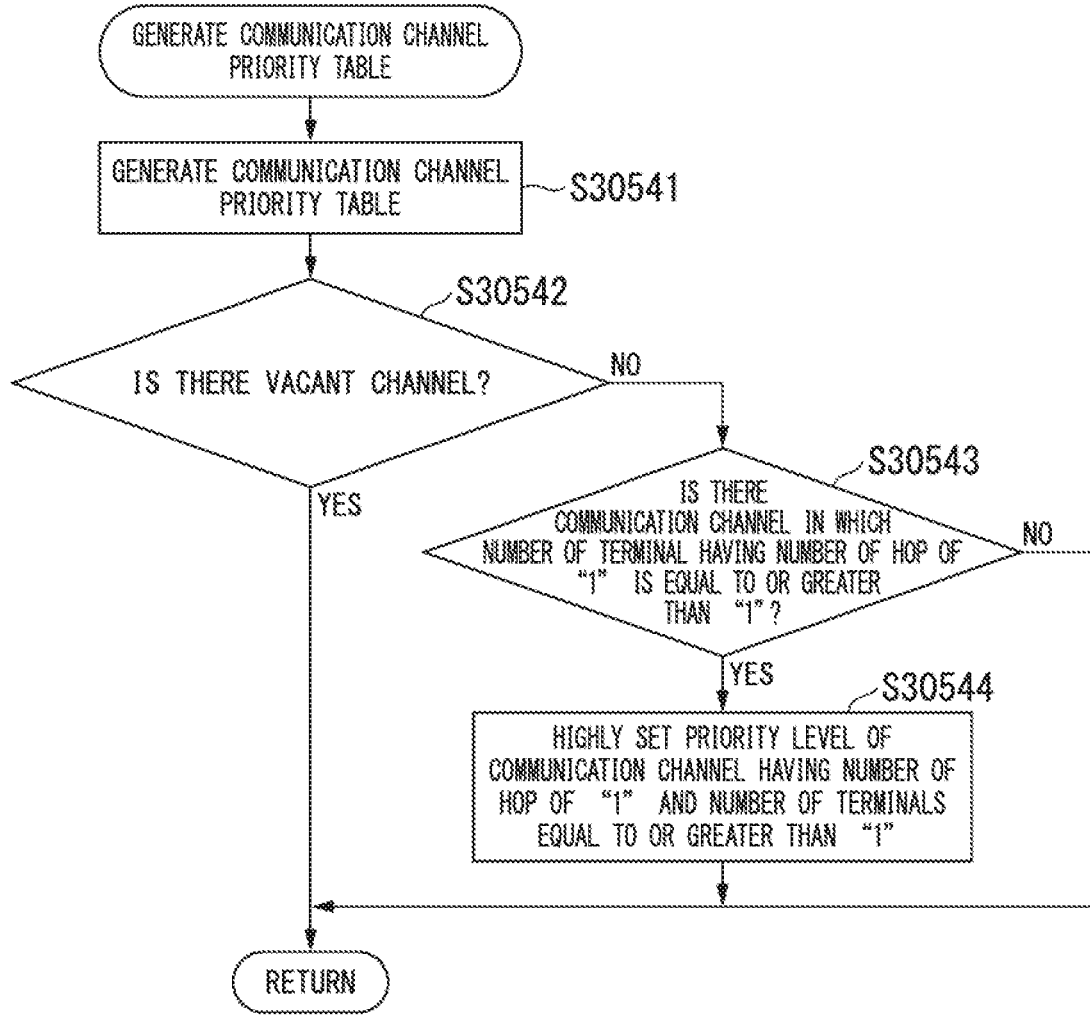
FIG. 29 is a flowchart showing the procedure of an operation of a receiver according to a third embodiment of the present invention.
FIG. 30 is a diagram showing a communication channel priority table according to the third embodiment of the present invention.

Points different from the first embodiment will be described by using the system shown in FIG. 9. FIG. 29 shows details of the process of Step S3054.

The controller 260 generates a communication channel priority table on the basis of the communication channel evaluation table (Step S30541). The communication channel priority table generated in Step S30541 is similar to the communication channel priority table in the first embodiment.

After Step S30541, the controller 260 determines whether there is a vacant channel on the basis of the communication channel information (Step S30542). The vacant channel is a communication channel that is not used in any one of a plurality of terminals represented by the communication channel information. In the communication channel evaluation table, a communication channel of which the numbers of terminals corresponding to all the hop number are "0" is a vacant channel.

In a case in which the controller 260 determines that there is no vacant channel in Step S30542, the process of Step S3054 ends. In such a case, the degree of interference of the vacant channel is "0." For this reason, a communication channel priority table in which the priority level of the vacant channel is highly set is generated.

In a case in which the controller 260 determines that there is no vacant channel in Step S30542, the controller 260 determines whether or not there is a communication channel of which the number of terminals in the hop number of "1" is equal to or greater than "1" in the communication channel evaluation table (Step S30543).

In Step S30543, in a case in which the controller 260 determines that there is no communication channel satisfying the condition, the process of Step S3054 ends. On the other hand, in a case in which the controller 260 determines that there is a communication channel satisfying the condition in Step S30543, the controller 260 highly sets the priority level of the communication channel in the communication channel priority table (Step S30544). By executing the process of Step S30544, the process of Step S3054 ends.

For example, in Step S30544, the controller 260 sets the priority level of a communication channel in which the number of terminals at the hop number of "1" is equal to or greater than "1" as being higher than the priority levels of the other communication channels. In a case in which there are a plurality of communication channels in which the number of terminals at the hop number of "1" is equal to or greater than "1," the controller 260 may finely set the priority levels of the plurality of communication channels on the basis of the degrees of interference.

FIG. 30 shows a communication channel priority table updated in Step S30544. In the communication channel evaluation table shown in FIG. 19, the number of terminals in each of the communication channel CH2 and the communication channel CH4 at the hop number of "1" is "1." For this reason, the priority levels of the communication channel CH2 and the communication channel CH4 are higher than those of the communication channel CH5 and the communication channel CH3. In the communication channel evaluation table shown in FIG. 19, a degree of interference for the communication channel CH4 is lower than the degree of interference of the communication channel CH2. For this reason, the priority level of the communication channel CH4 is higher than that of the communication channel CH2.

The method of highly setting the priority levels of communication channels in which the number of terminals at the hop number of "1" is equal to or greater than "1" is not limited to the method described above.

In Step S30544, information of communication channels other than communication channels in which the number of terminals with the hop number of "1" is equal to or greater than "1" may be removed from the communication channel priority table.

As described above, in a case in which there is no vacant channel, a communication channel in which CSMA/CA effectively operates is used for communication of image data. For this reason, the receiver 201 can perform satisfactory wireless communication.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A wireless communication terminal comprising:
a communicator; and
a controller,
wherein the controller is configured to wirelessly receive communication channel information from a first terminal by using the communicator,
the communication channel information represents a communication channel used for wireless communication by at least one of a plurality of terminals including the first terminal and a second terminal,
the first terminal is able to directly wirelessly communicate with a fourth terminal and directly communicate with the wireless communication terminal,
the second terminal is a terminal other than the wireless communication terminal and is able to directly wirelessly communicate with a fifth terminal and directly communicate with the first terminal,
the communication channel information transmitted from the first terminal to the wireless communication terminal includes first information and second information,
the communication channel information transmitted from the second terminal to the first terminal includes the second information,
the first information represents a communication channel used for wireless communication with the fourth terminal by the first terminal, the second information represents a communication channel used for wireless communication with the fifth terminal by the second terminal, and the controller is configured to determine a communication channel used for wireless communication by the wireless communication terminal on the basis of the first information and the second information of the second terminal that is unable to directly wirelessly communicate with the wireless communication terminal.

2. The wireless communication terminal according to claim 1, wherein the controller is configured to estimate a degree of interference for each of a plurality of communication channels having a possibility of being used by the wireless communication terminal by using a weighting factor for a third terminal which is using each of the plurality of communication channels, the third terminal is one of the plurality of terminals, the weighting factor is in inversely proportion to a hop number, the hop number is the number of sections through which the communication channel information transmitted by the third terminal passes before the communication channel information is received by the wireless communication terminal, each of the sections is composed of a communication route of a transmission terminal that has transmitted the communication channel information and a reception terminal that has received the communication channel information from the transmission terminal, each of the transmission terminal and the reception terminal is one of the plurality of terminals, and the controller is configured to determine to use the communication channel of which the estimated degree of interference is relatively low.

3. The wireless communication terminal according to claim 2, wherein the controller is configured to calculate a first value for each communication channel included in the plurality of communication channels and for each hop number by multiplying the number of the third terminals of which the hop numbers are the same by the weighting factor, and the controller is configured to estimate the degree of interference by calculating a second value acquired by adding the first values calculated for each hop number for each of the communication channel.

4. The wireless communication terminal according to claim 2, wherein the controller is configured to estimate the degree of interference by using only the communication channel information representing a communication channel used for wireless communication by the third terminal of which the hop number is equal to or less than "2" among the received communication channel information.

5. The wireless communication terminal according to claim 2, wherein the controller is configured to determine whether or not there is a communication channel that is not used in any one of the plurality of terminals on the basis of the communication channel information, and the controller is configured to determine to use the communication channel of which the estimated degree of interference is relatively low among communication channels used by the first terminal, in a case in which the controller determines that there is no communication channel that is not used in any one of the plurality of terminals.

6. A wireless communication method comprising a first step and a second step executed by a wireless communication terminal, wherein, in the first step, communication channel information is wirelessly received from a first terminal, the communication channel information represents a communication channel used for wireless communication by at least one of a plurality of terminals including the first terminal and a second terminal, the first terminal is able to directly wirelessly communicate with a fourth terminal and directly communicate with the wireless communication terminal, the second terminal is a terminal other than the wireless communication terminal and is able to directly wirelessly communicate with a fifth terminal and directly communicate with the first terminal, the communication channel information transmitted from the first terminal to the wireless communication terminal includes first information and second information, the communication channel information transmitted from the second terminal to the first terminal includes the second information, the first information represents a communication channel used for wireless communication with the fourth terminal by the first terminal, the second information represents a communication channel used for wireless communication with the fifth terminal by the second terminal, and in the second step, a communication channel used for wireless communication by the wireless communication terminal is determined on the basis of the first information and the second information of the second terminal that is unable to directly wirelessly communicate with the wireless communication terminal.

7. A non-transitory computer-readable recording medium saving a program for causing a computer of a wireless communication terminal to execute a first step and a second step, wherein, in the first step, communication channel information is wirelessly received from a first terminal, the communication channel information represents a communication channel used for wireless communication by at least one of a plurality of terminals including the first terminal and a second terminal, the first terminal is able to directly wirelessly communicate with a fourth terminal and directly communicate with the wireless communication terminal, the second terminal is a terminal other than the wireless communication terminal and is able to directly wirelessly communicate with a fifth terminal and directly communicate with the first terminal, the communication channel information transmitted from the first terminal to the wireless communication terminal includes first information and second information, the communication channel information transmitted from the second terminal to the first terminal includes the second information, the first information represents a communication channel used for wireless communication with the fourth terminal by the first terminal, the second information represents a communication channel used for wireless communication with the fifth terminal by the second terminal, and in the second step, a communication channel used for wireless communication by the wireless communication terminal is determined on the basis of the first information and the second information of the second terminal that is unable to directly wirelessly communicate with the wireless communication terminal.

* * * * *